US009292307B2

(12) United States Patent
Yamamoto

(10) Patent No.: US 9,292,307 B2
(45) Date of Patent: Mar. 22, 2016

(54) USER INTERFACE GENERATION APPARATUS

(75) Inventor: Kazuhiro Yamamoto, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 98 days.

(21) Appl. No.: 13/056,232

(22) PCT Filed: Jun. 29, 2009

(86) PCT No.: PCT/JP2009/063523
§ 371 (c)(1),
(2), (4) Date: Jan. 27, 2011

(87) PCT Pub. No.: WO2010/013758
PCT Pub. Date: Feb. 4, 2010

(65) Prior Publication Data
US 2011/0131513 A1  Jun. 2, 2011

(30) Foreign Application Priority Data

Jul. 30, 2008  (JP) .................................. 2008-196620

(51) Int. Cl.
*G06F 3/048* (2013.01)
*G06F 9/44* (2006.01)
*G06F 3/147* (2006.01)
*H04M 1/725* (2006.01)

(52) U.S. Cl.
CPC .............. *G06F 9/4443* (2013.01); *G06F 3/147* (2013.01); *G09G 2370/06* (2013.01); *G09G 2370/24* (2013.01); *G09G 2380/00* (2013.01); *H04M 1/72519* (2013.01); *H04M 1/72533* (2013.01); *H04M 1/72583* (2013.01); *H04M 2250/22* (2013.01)

(58) Field of Classification Search
None
See application file for complete search history.

(56) References Cited

U.S. PATENT DOCUMENTS

| 4,855,746 | A | * | 8/1989 | Stacy | 341/176 |
| 5,341,166 | A | * | 8/1994 | Garr et al. | 725/153 |
| 6,198,481 | B1 | * | 3/2001 | Urano et al. | 715/835 |
| RE41,453 | E | * | 7/2010 | Wall et al. | 340/12.3 |

(Continued)

FOREIGN PATENT DOCUMENTS

| JP | 11-122682 | 4/1999 |
| JP | 2001-036652 | 2/2001 |

(Continued)

OTHER PUBLICATIONS

Office Action dated Jun. 29, 2012 issued by the Korean Patent Office in the corresponding Korean patent application 10-2011-7002147.

*Primary Examiner* — Matt Kim
*Assistant Examiner* — Tuan S Nguyen
(74) *Attorney, Agent, or Firm* — Workman Nydegger

(57) ABSTRACT

A user interface generation apparatus 1 has a memory unit 50 for storing an application program and a control unit 10 for controlling to display a stand-alone user interface object group when instructed to generate a single user interface and for controlling to perform compound processing on user interface objects extracted from the stand-alone user interface object groups and to display a compound user interface object group. The control unit 10, when instructed to generate the plurality of user interfaces, displays a user interface object for switching to display of a stand-alone user interface object group displayed when instructed to generate each of the plurality of user interfaces alone.

1 Claim, 14 Drawing Sheets

(56) References Cited

U.S. PATENT DOCUMENTS

| | | | |
|---|---|---|---|
| 8,255,914 B1* | 8/2012 | Joyce et al. | 718/103 |
| 2003/0080874 A1* | 5/2003 | Yumoto et al. | 340/825.71 |
| 2004/0070627 A1* | 4/2004 | Shahine et al. | 345/794 |
| 2005/0132408 A1* | 6/2005 | Dahley et al. | 725/80 |
| 2005/0172228 A1* | 8/2005 | Kakuda | 715/530 |
| 2007/0136778 A1* | 6/2007 | Birger et al. | 725/117 |
| 2011/0131513 A1* | 6/2011 | Yamamoto | 715/763 |
| 2012/0154195 A1* | 6/2012 | Nystrom et al. | 341/176 |

FOREIGN PATENT DOCUMENTS

| | | | |
|---|---|---|---|
| JP | 2002-345057 | 11/2002 | |
| JP | 2002345057 A * | 11/2002 | H04Q 9/00 |
| JP | 2008117061 | 5/2008 | |
| JP | 2010-522743 | 9/2012 | |
| JP | 2010-522743 | 1/2013 | |
| KR | 10-2011-7002147 | 1/2013 | |

* cited by examiner

FIG. 4
(A)
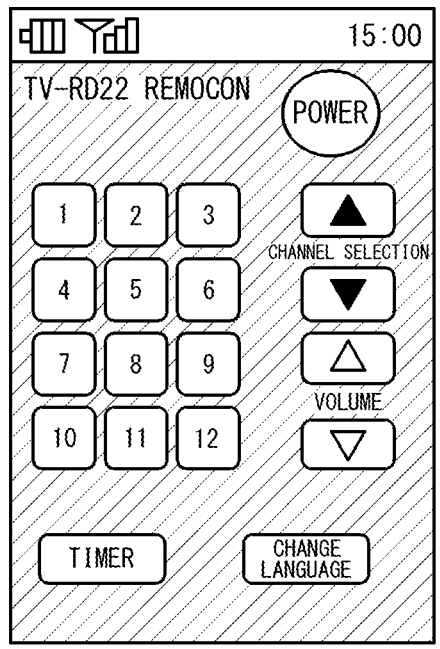
(B)
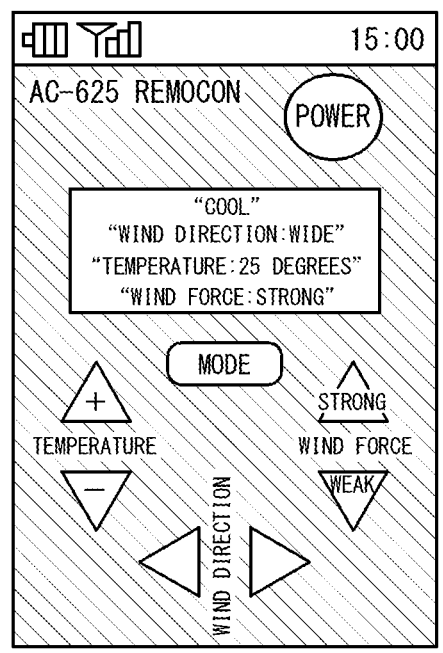

FIG. 5
(A)
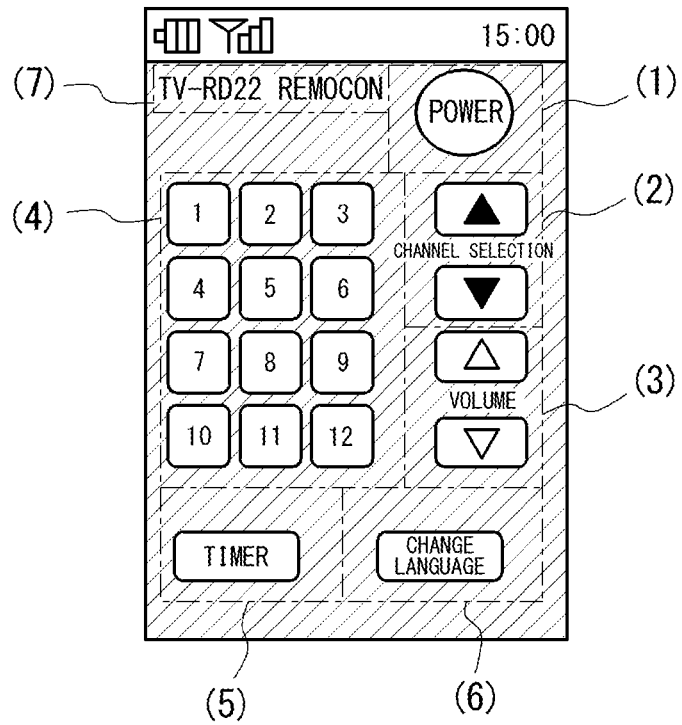
(B)
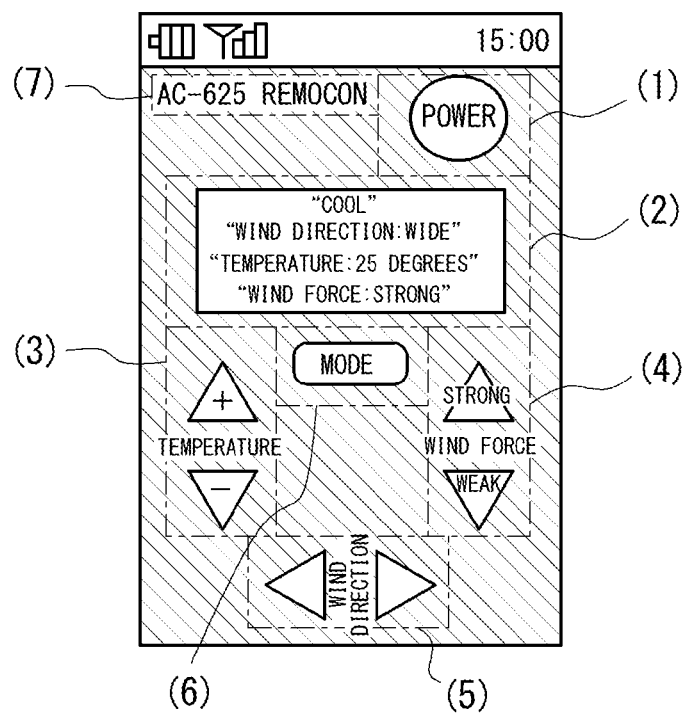

FIG. 12
(A)
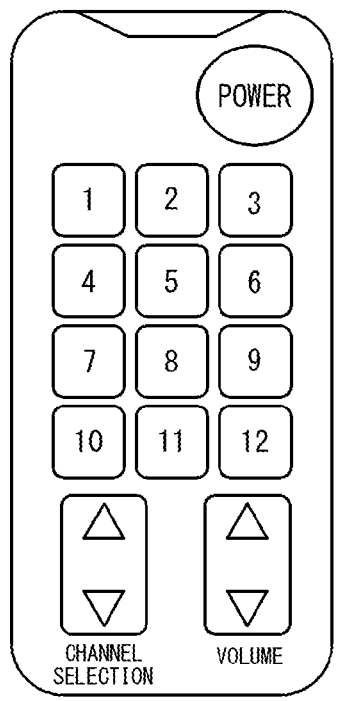
(C)
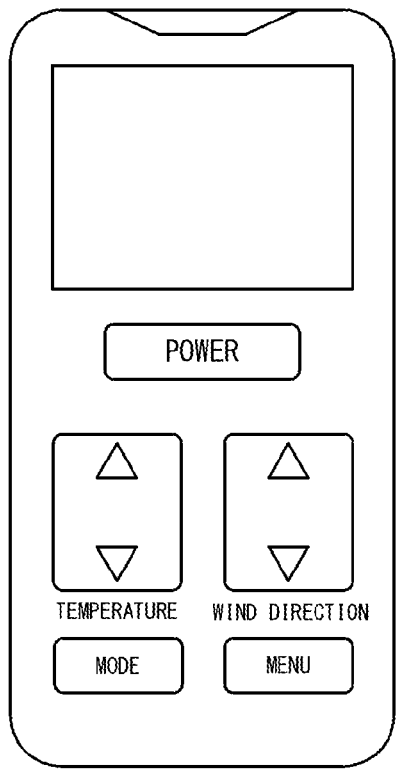
(B)
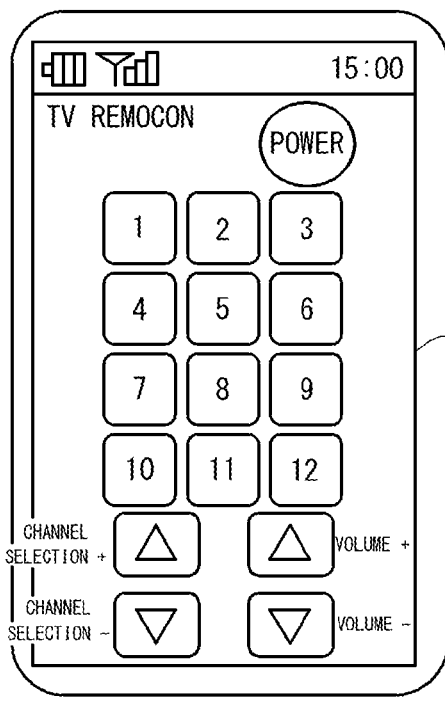
(D)
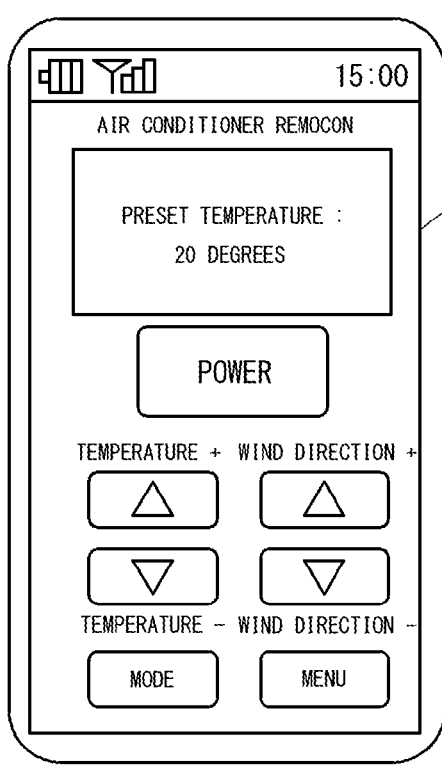

FIG. 13
(A) 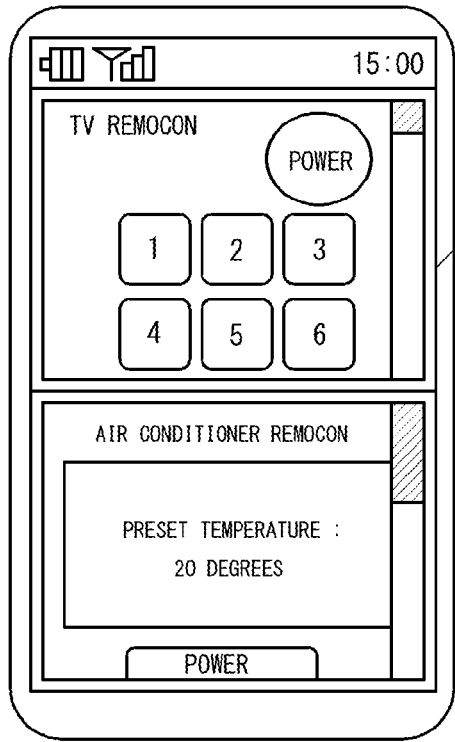
(B) 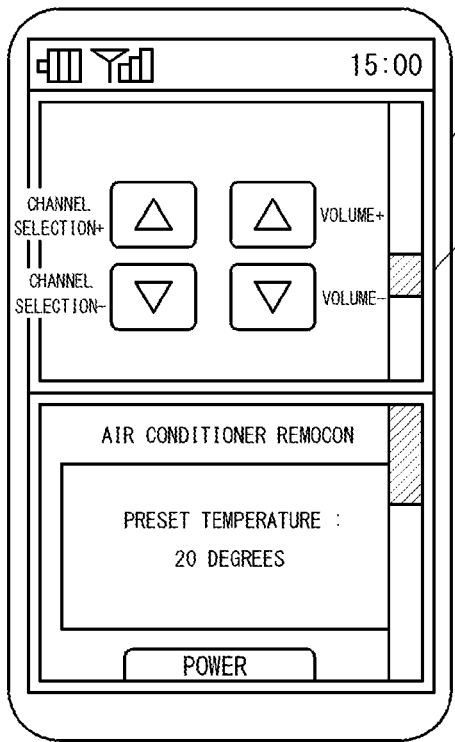
(C) 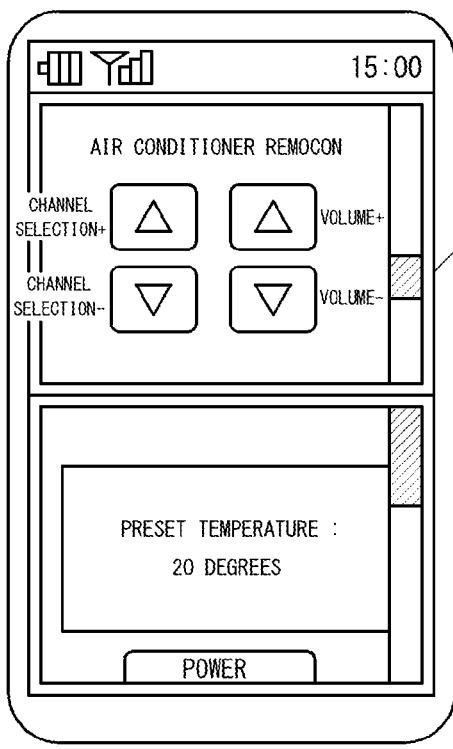
(D) 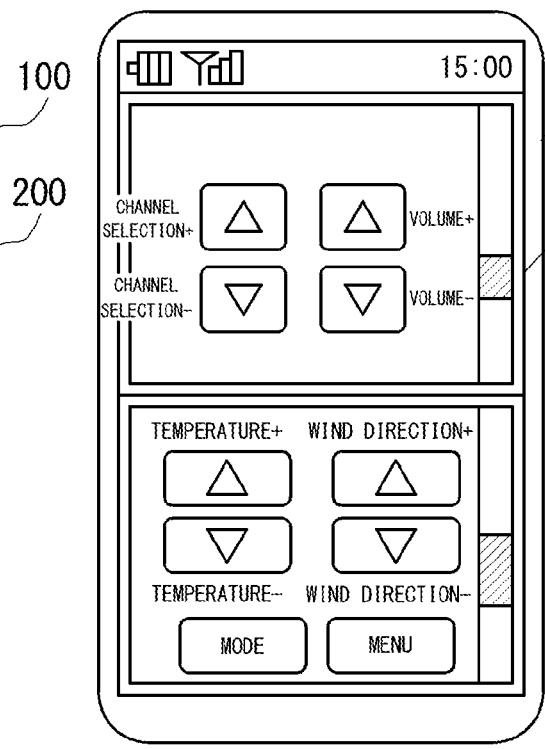

USER INTERFACE GENERATION APPARATUS

CROSS REFERENCE TO RELATED APPLICATION

This application claims priority to and the benefit of Japanese Patent Application No. 2008-196620 filed on Jul. 30, 2008, the entire contents of which are incorporated herein by reference.

TECHNICAL FIELD

The present invention relates to user interface generation apparatuses, and particularly, to user interface generation apparatuses for generating user interfaces of mobile terminals.

BACKGROUND ART

The user interface (hereinafter, arbitrarily abbreviated to "UI") of the mobile terminal represented by a mobile phone has a great influence on operability when a user operates the mobile terminal. Accordingly, the UI of the mobile terminal is one of important factors for the user to purchase the mobile terminal.

With significant multi-functioning of the mobile terminal in recent years, there are numerous mobile terminals having picturesque UIs using animation and 3D display. In addition, there are mobile terminals having UIs which can be customized as desired by users. Such mobile terminals dramatically improve convenience for the users.

Conventional mobile terminals generally have UI designs and operation methods which are different between manufacturers and models. That is, the UI is unique to each terminal and most of the conventional mobile terminals have UIs highly dependent on models. Therefore, when program codes of another terminal are reused in developing a terminal, it leads to voluminous change in parts of the UI to the program codes. Accordingly, it has been difficult to port program codes of a terminal to another terminal.

In order to deal with such a problem, a UI based on XML (Extensible Markup Language) has been introduced. Expressing the UI by using an XML file whose description method is standardized facilitates reuse of the program codes and enables to port the UI to another model. Accordingly, it also enables to deal with UI alone independently from each terminal, such that the UI can be used by terminals of different models and different manufactures.

Representatives of such XML-based UI are UI Foundation developed by TAT (http://www.tat.se/), VIVID UI developed by Acrodea, Inc. (http://www.acrodea.co.jp/), UI One developed by Qualcomm Incorporated (http://www.qualcomm.co.jp/) and the like.

In addition, with multi-functioning and high-performance of a terminal body, an increasing number of recent mobile terminals mount OS (Operating System) which can perform the multi-task processing for simultaneously executing a plurality of tasks in parallel. Moreover, mobile terminals with multi-window function to multiplex output screen displays by allocating a plurality of tasks processed in parallel and simultaneously to respective display areas (windows), have been becoming widely used.

Incidentally, Japanese Patent Laid-Open No. 2001-36652 discloses a scheme of remote handling (control) of a plurality of external equipments by infrared communication using a mobile phone terminal having an infrared communication unit. The mobile phone terminal described in Japanese Patent Laid-Open No. 2001-36652 is provided with an external control unit for communicating with the external equipments. This mobile phone terminal stores the external equipment control information for remotely controlling the external equipments, obtained via a telephone line or received from the external equipments, and remotely controls the external equipments based on the external equipment control information. That is, by changing an application program (hereinafter, referred to as "application" simply) incorporated in the terminal, the terminal body, which is normally used as the mobile phone, can be used as a remote controller (hereinafter, referred to as "remocon" simply) for remotely controlling the plurality of external equipments.

SUMMARY OF INVENTION

Technical Problem

According to the mobile phone terminal disclosed in the above Japanese Patent Laid-Open No. 2001-36652, a single mobile phone terminal can remotely control a plurality of external equipments based on respective external equipment control information corresponding to the external equipments. Therefore, there is no need to do cumbersome operation for a user to separately use individual remocon terminals for the plurality of external equipments, which improves convenience for the user.

If such functions of the remocon to remotely switch between the plurality of external equipments to be controlled remotely is implemented in the mobile terminal capable of multi-task processing stated above, it is not necessary to finish a remocon application to initiate another remocon application. That is, it is possible to initiate a plurality of applications on a single terminal at the same time and to use a desired remocon application among them timely.

However, the operation to switch the plurality of applications frequently is cumbersome.

If the multi-windows function stated above is embedded in the mobile terminal, UIs for operating a plurality of applications can be displayed on a plurality of windows, respectively. Thereby, it is possible to use the applications on a single screen simultaneously without switching among the plurality of applications.

That is, for a TV remocon terminal alone as shown in FIG. 12(A), for example, a TV remocon application UI may be reproduced on a touch panel 200 of a mobile terminal 100, for example, while maintaining operability of the TV remocon terminal, as shown in FIG. 12(B). Although keys such as numerical keys or buttons of the remocon terminal shown in FIG. 12(A) are mechanical keys, the numerical keys or the buttons are reproduced as objects and displayed on the touch panel 200 of the mobile terminal 100 shown in FIG. 12(B). Hereinafter, various keys or buttons and information displaying spots composing the UI displayed on the touch panel are referred to as "UI objects". Similarly, for an air conditioner remocon terminal alone as shown in FIG. 12(C), an air conditioner remocon application UI may be reproduced on the touch panel 200 of the mobile terminal 100, while maintaining operability of the air conditioner remocon terminal, as shown in FIG. 12(D). Moreover, if each UI of the applications is described in XML as the basis, almost the same UI can be easily reproduced in another terminal only by processing the XML file describing the UI, even if the application is ported to the another terminal of a different manufacturer.

However, in order to operate an air conditioner while viewing a TV in the above example, there may be a need for cumbersome operations for both of the TV and the air conditioner. In such a case, the applications for both the TV and the air conditioner may be displayed simultaneously by dividing a display area of the display unit by using the multi-task function and the multi-window function. However, simultaneous display of the UIs results in displays as shown in FIG. 13(A) to (D), as each application has only the UI which assumed to be used solely.

FIG. 13(A) to (D) are diagrams illustrating states when the UIs of two applications are simultaneously displayed by using the mobile terminal 100 having the multi-task function and the multi-window function. In the examples shown in the figures, only a part of each UI is displayed, as each of the UIs is reproduced as it stands in each of the windows vertically separating the display unit of the touch panel 200. A scroll bar is provided on the right in each window so as to enable operation of parts beyond the screen.

In order to adjust volume of the TV in a state shown as FIG. 13(A), for example, the user needs to move the scroll bar in the window of the TV remocon UI so as to move a displayed area of the TV remocon UI, as shown in FIG. 13(B). Similarly, in order to adjust temperature of the air conditioner in a state shown as FIG. 13(C), for example, the user needs to move the scroll bar in the window of the air conditioner remocon UI so as to move a displayed area of the air conditioner remocon UI, as shown in FIG. 13(D). Moreover, when a plurality of applications are activated by using the multi-window function, it is necessary to activate the window by selecting it in order to display the UI on top of other UIs before starting input operation.

The terminal body of the mobile terminal in particular is designed to be compact, thus an area usable by either UI constituted of the touch panel or UI constituted of physical keys is very limited. Therefore, an operation unit constituting the UI of the application such as the remocon is generally designed in a minimum size. Accordingly, it is not realistic to reduce a size of each UI entirely in order to display the Ms of the plurality of applications at the same time.

As stated above, if the UI designed to occupy an entire screen and assumed to be used alone (hereinafter, abbreviated to a "stand-alone UI" arbitrarily) is displayed by using the multi-window function, it results in deterioration of operability of the UI.

In order to address such a problem, it may be considered to generate a compounded UI (hereinafter, abbreviated to a "compound UI") composed of UI objects selected from UI objects of keys or buttons composing each stand-alone UI. For example, it may be considered to generate a compound UI as shown in FIG. 14 by selecting predetermined UI objects from the TV remocon application UI shown in FIG. 12(B) and the air conditioner remocon application shown in FIG. 12(D). FIG. 14 shows an example of the mobile terminal 100 displaying a compound UI, composed of predetermined UI objects selected from the above two remocon application UIs, on the touch panel 200.

This method to compound UIs enables to compose a compound UI by selecting frequently used UI objects or UI objects desired by the user, which rules out the need for reducing a size of each UI object sacrificing usability, that is, operability.

However, if a compound UI is generated by selecting the predetermined UI objects in this manner, some UI objects remain unselected in generation of the compound UI. For example, in the compound UI displayed on the touch panel 200 of the mobile terminal 100 in FIG. 14, UI objects for temperature adjustment (UI objects of temperature+ and temperature−) of the air conditioner remocon UI shown in FIG. 12(D) are not selected. Therefore, the user cannot adjust temperature with this compound UI. In this case, the user has to close the compound UI being displayed and an application related to the compound UI and then activates an application which uses a stand-alone UI including a desired UI object. Such operations are burdensome and take time.

In the above example, it may be considered to set UI objects, such as temperature adjusters of the air conditioner, assumed to be used frequently to be selected automatically or to let the user select desired UI objects in generation of a compound UI. Even with such selections, however, it still causes the same problem as long as a compound UI is generated by using the UI objects selected from the plurality of stand-alone UIs, if the user desires to input to a UI object unselected.

In addition, once an application which uses the stand-alone UI is activated to display an UI object which is not included in the compound UI, in order to return to the compound UI it is necessary to close the application using the stand-alone UI and activate the application which uses the compound UI. It is very burdensome for the user to be required to perform those operations every time using the UI object of the stand-alone UI not included in the compound UI.

Therefore, it is an object of the present invention in consideration of such conditions to provide a user interface generation apparatus which enables input to the stand-alone user interface by a simple operation even after user interfaces of a plurality of application programs are compounded.

Solution to Problem

In order to achieve the above object, a user interface generation apparatus according to a first aspect includes:
a memory unit capable of storing an application program; and
a control unit, when instructed to generate a single user interface based on the application program stored in the memory unit, for controlling so as to display a stand-alone user interface object group corresponding to the user interface instructed and, when instructed to generate a plurality of user interfaces, for controlling so as to perform compound processing on user interface objects extracted from stand-alone user interface object groups corresponding to the plurality of user interfaces instructed, respectively, and to display a compound user interface object group, wherein
the control unit, when instructed to generate the plurality of user interfaces, displays a user interface object for switching to display of a stand-alone user interface object group displayed when instructed to generate each of the plurality of user interfaces alone.

In order to achieve the above object, a user interface generation apparatus according to a second aspect includes:
a memory unit capable of storing an application program; and
a control unit, when instructed to generate a single user interface based on the application program stored in the memory unit, for controlling so as to display a stand-alone user interface object group corresponding to the user interface instructed and, when instructed to generate a plurality of user interfaces, for controlling so as to perform compound processing on user interface objects extracted from stand-alone user interface object groups corresponding to the plurality of user interfaces instructed, respectively, and to display a compound user interface object group, wherein
the control unit, when instructed to generate the plurality of user interfaces, associates an action to switch to display of a stand-alone user interface object group, displayed when instructed to generate each of the plurality of user interfaces alone, with any of the user interface objects extracted.

A third aspect of the present invention is that, in the user interface generation apparatus according to the second aspect, the control unit associates the action to switch to the display of the stand-alone user interface object group, as a new action, with a user interface object having no action associated therewith among the user interface objects extracted.

A fourth aspect of the present invention is that, in the user interface generation apparatus according to the second aspect, the control unit associates the action to switch to the display of the stand-alone user interface object group, as an additional action, with any of the user interface objects extracted.

BRIEF DESCRIPTION OF DRAWINGS

FIG. 4 is a diagram illustrating stand-alone user interfaces according to the first embodiment;

FIG. 5 is a diagram illustrating information on priority orders, which is user interface object attribute information, according to the first embodiment;

FIG. 12 is a diagram illustrating states of conventional remote controller terminals reproduced by the user interfaces of a mobile terminal;

FIG. 13 is a diagram exemplifying compound of two user interfaces by a conventional mobile terminal.

DESCRIPTION OF EMBODIMENTS

Embodiments of the present invention will be described with reference to the accompanying drawings. In each of the embodiments described below, a mobile phone having a remocon function for remotely controlling various external apparatuses is used as an example of a user interface (hereinafter, referred to as "UI") generation apparatus according to the present invention. However, the UI generation apparatus according to the present invention is not limited to the mobile phone but may be applicable to any portable terminals such as, for example, a laptop computer, PDA and the like. In addition, the UI generation apparatus according to the present invention is also applicable to an apparatus which needs to mount it, even if it is not a mobile terminal. It is to be noted that the present invention primarily intends to compound a plurality of UIs to be used simultaneously. Therefore, an application instructed by each UI is not limited to a remocon function but the present invention may be applicable to various kinds of applications.

First Embodiment

Figure 1:
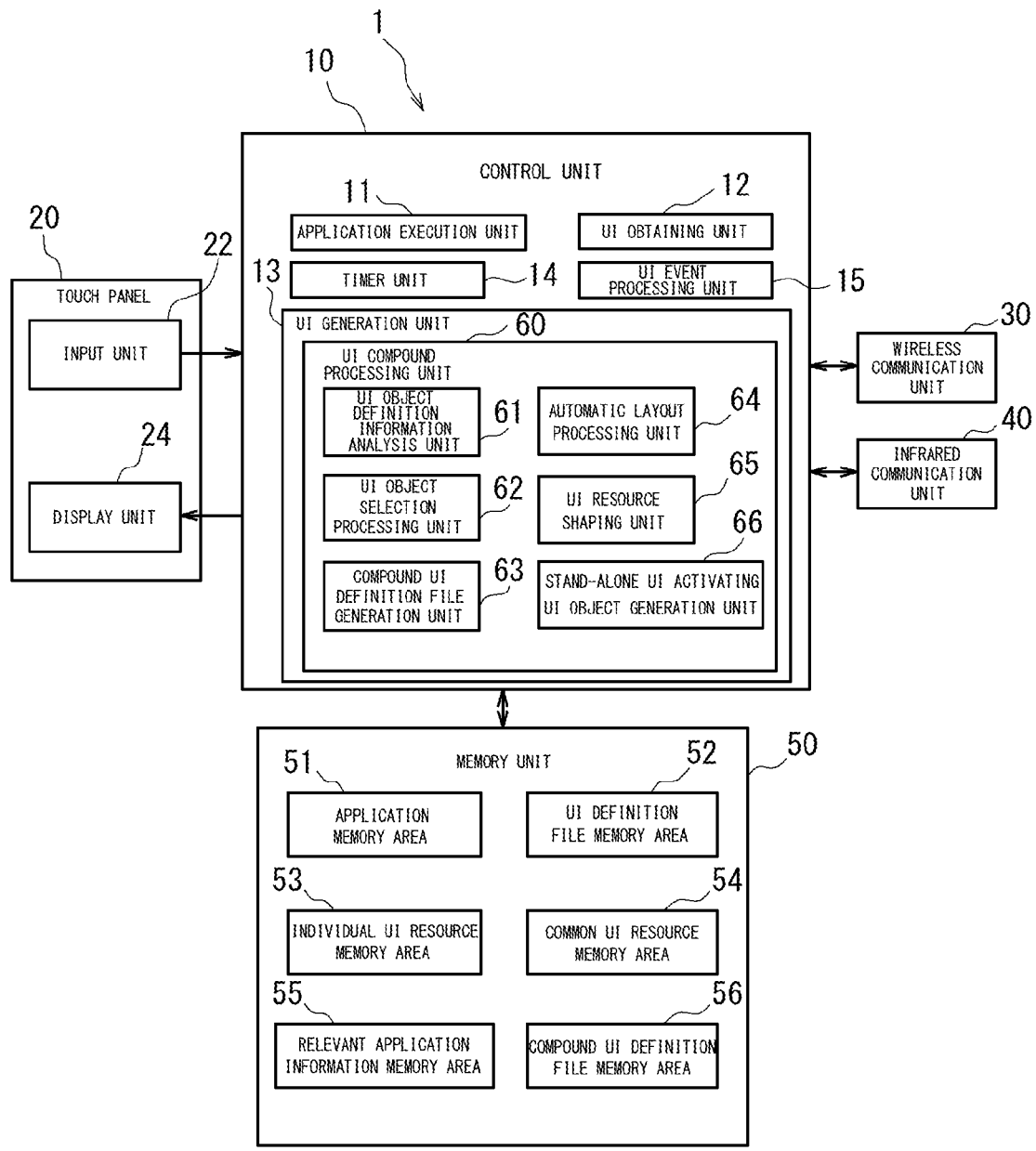
FIG. 1 is a block diagram illustrating a schematic configuration of a user interface generation apparatus according to a first embodiment.

FIG. 1 is a block diagram illustrating a schematic configuration of a mobile phone, which is a UI generation apparatus according to a first embodiment of the present invention.

A mobile phone 1 includes a control unit 10 for controlling the overall operation and a touch panel 20 for receiving input by a user and for displaying a result of input and the like, according to each application. The touch panel 20 has an input unit 22 constituted of matrix switches and the like to receive input by the user and arranged on top of a display unit 24 constituted of a liquid crystal display and the like. The input unit 22 of the touch panel 20, by detecting contact of a finger of the user or a pen-shaped input device such as a stylus, outputs a signal corresponding to input by such contact. The display unit 24 displays a screen in relation to an application program, as well as displaying an image of a UI, which is composed of UI objects such as various types of keys or buttons for receiving input by the user, in a predetermined UI display area. It is to be noted that the UI display area is an area of the display unit 24 of the touch panel 20 to display a UI composed of UI objects.

In addition, the mobile phone 1 further includes a wireless communication unit 30 for transmitting and receiving various information such as voice call, data of e-mail and the like to/from a base station (not shown) via Internet, by radio or the like, and an infrared communication unit 40 for communicating with various external equipments (not shown) by using infrared rays. The mobile phone 1 transmits and receives a variety of data to/from external equipments by using the wireless communication unit 30 via the internet, by radio and the like.

The mobile phone 1 further includes a memory unit 50 for storing input information and various applications and also for functioning as a work memory. The memory unit 50 includes an application memory area 51, a UI definition file memory area 52, an individual UI resource memory area 53, a common UI resource memory area 54, a relevant application information memory area 55, and a compound UI definition file memory area 56.

The control unit 10 includes an application execution unit 11, a UI obtaining unit 12, a UI generation unit 13, a timer unit 14 and a UI event processing unit 15.

The application execution unit 11 of the control unit 10 reads out and executes various applications stored in the application memory area 51 of the memory unit 50, as well as performing control in relation to such execution. In addition, the application execution unit 11, based on input to the UI corresponding to the application read out from the application memory area 51 and executed, executes functions of the application corresponding to the input.

The UI obtaining unit 12 obtains a resource (image data and the like) and a UI definition file (XML file and the like) from outside the terminal via the wireless communication unit 30. The UI generation unit 13 performs parsing process (parsing) and DOM (Document Object Model) process on the UI definition file to generate the UI to be used actually. The UI generation unit 13 interprets information of the UI, described in an XML form, by using an XML engine and displays the UI generated based on the UI definition file on the display unit 24 of the touch panel 20. The UI generation unit 13 performs various processing in relation to generation of UIs including compound UIs. The UI generation unit 13 will be described in detail below.

The timer unit 14 is capable of measuring a period of time by a counter, as well as outputting a current time and, at a predetermined time (set in advance), notifying accordingly. The UI event processing unit 15 processes an event to an UI generated by the UI generation unit 13 occurred based on operation input to the input unit 22 and the like by the user, as well as instructing the application execution unit 11 to execute various functions appropriately.

The UI generation unit 13 includes a UI compound processing unit 60 for performing UI compound processing based on a plurality of UI definition files. The UI compound processing unit 60 includes a UI object definition information analysis unit 61, a UI object selection processing unit 62, a compound UI definition file generation unit 63, an automatic layout processing unit 64, a UI resource shaping unit 65 and a stand-alone UI activating UI object generation unit 66.

The UI object definition information analysis unit 61 analyzes UI object definition information defining various UI objects included in the UI definition file.

The UI object selection processing unit 62 performs processing to select a necessary UI object from multiple UI objects, either automatically or by input of the user. When selection is performed by input of the user, the UI object selection processing unit 62 performs processing and control to generate a selection screen for receiving input to select a UI object by the user, by analyzing the UI object definition information defining the UI object to be displayed on the display unit 24.

The compound UI definition file generation unit 63 generates and outputs a UI compounded by the UI compound processing unit 60, as a compound UI definition file.

The automatic layout processing unit 64 performs control and processing in relation to a layout when compounding the UIs. For example, the automatic layout processing unit 64 performs arrangement setting processing of each UI object, arrangement availability determination processing, reducing object selection processing, minimum size setting processing, margin setting processing and the like. The followings are descriptions of those processing.

The arrangement setting processing of each UI object is to virtually arrange UI objects by following a predetermined procedure before actually arranging the UI objects in the predetermined UI display area. The arrangement availability determination processing is to determine whether the UI objects virtually arranged by the arrangement setting processing can be arranged in the predetermined UI display area. If the arrangement availability determination unit determines that it is not possible to arrange all of the UI objects in the predetermined UI display area, the reducing object selection processing selects a UI object to be reduced by following a predetermined procedure. The minimum size setting processing is to set a lower limit of reduction for each UI object in accordance with terminal-dependent information and the UI object definition information. The margin setting processing is to set a gap (margin) around a UI object when the UI object is arranged, so as to prevent the UI object from being located too close to another UI object or an edge of the UI display area.

The UI resource shaping unit 64 performs preview processing of selected UI objects and processing to enlarge or reduce data of resource used to compound UIs, based on a display size of each UI object. In this case, the UI resource shaping unit 64 reads out and uses data of resource stored in the individual UI resource memory are 53 or the common UI resource memory area 54.

The stand-alone UI activating UI object generation unit 66 generates a UI object including information (stand-alone UI activation information) for activating a stand-alone UI in which an UI object selected in generation of a compound UI is originally included. The processing to generate a UI object for activating stand-alone UI will be described below.

The application memory area 51 of the memory unit 50 stores a variety of applications constituted of data describing procedures to implement various functions. The UI definition file memory area 52 stores the UI definition file defining a sequence of generation rules to generate each UI overall. The individual UI resource memory area 53 stores individual UI resource such as image data and character string (text) data used to generate UI unique to each application. The common UI resource memory area 54 stores common UI resource such as image data and font data commonly used by the Ms used by the terminal, except for the individual UI resource unique to each application. When the UI is actually generated, image data, text data and the like stored in the individual UI resource memory area 53 and the common UI resource memory area 54 are displayed on the display unit 24 of the touch panel 20.

In addition, the relevant application information memory area 55 stores relevant application information including activation information of an application in relation to the compound UI definition file (described below). Moreover, the compound UI definition file memory area 56 stores the compound UI definition file generated by the compound UI definition file generation unit 63.

Next, the UI definition file stored in the UI definition file memory area 52 according to the present embodiment is described.

The UI definition file memory area 52 of the memory unit 50 stores the UI definition file defining specifications and operations of an application of a UI, required to execute the application stored in the application memory area 51. Although the same UI may be used by different applications, here it is assumed that UIs used by different applications differ from one another, for convenience of description, and that each UI definition file corresponding to each application is stored.

For example, a TV remocon UI definition file is stored in the UI definition file memory area 52, correspondingly to a TV remocon application for remotely controlling a TV set (not shown), which is an external equipment, by using the mobile phone 1. Similarly, an air conditioner remocon UI definition file is stored in the UI definition file memory area 52, correspondingly to an air conditioner remocon application for remotely controlling an air conditioner (not shown), which is another external equipment, by using the mobile phone 1.

In the present embodiment, a UIML (User Interface Markup Language) form based on XML language is used as an example of a language to describe the UI definition file. In order to activate a UI to use, the UI generation unit 13 displays the UI on the display unit 24 of the touch panel 20 of the mobile phone 1 in accordance with definition described in the UIML form, and the application execution unit 11 executes processing in response to input to the input unit 22 by the user.

Figure 2:
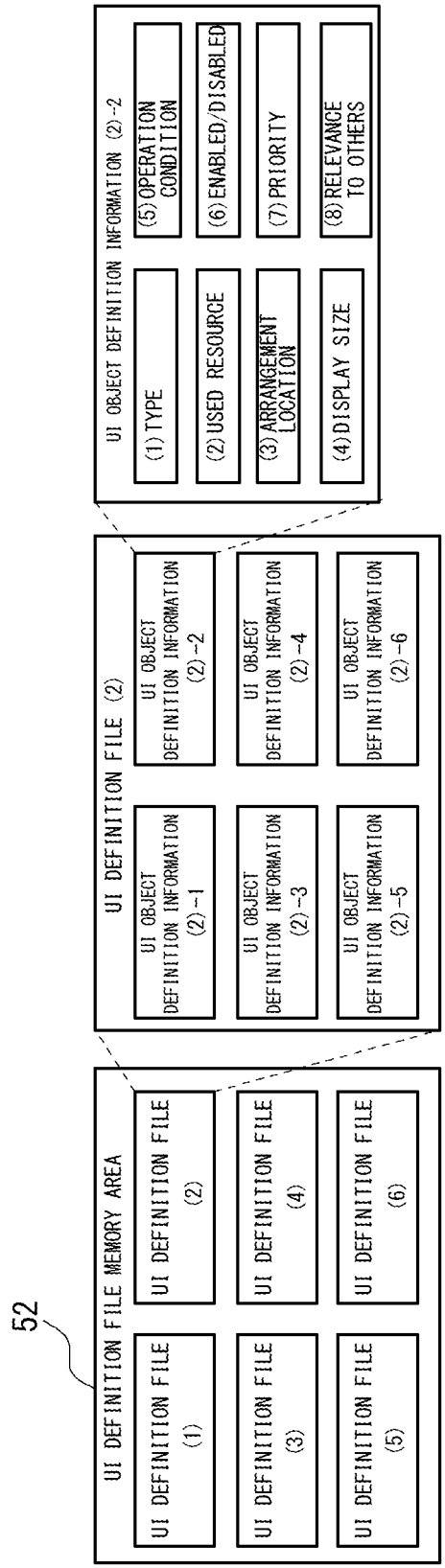
FIG. 2 is a conceptual diagram illustrating a structure of a user interface definition file according to the present invention.

FIG. 2 is a conceptual diagram illustrating a structure of the UI definition file. As shown in FIG. 2, the UI definition file memory area 52 of the memory unit 50 of the mobile phone 1 stores UI definition files each of which defines a sequence of generation rules to generate an entire UI. Although six UI definition files (1) to (6) are stored in FIG. 2, the UI definition file memory area 52 may store any number of UI definition files in accordance with the UI to be used.

In addition, as shown in FIG. 2, each UI definition file includes a plurality of UI object definition information. Although the UI definition file (2) includes six UI object definition information ((2)-1 to (2)-6) in FIG. 2, the UI definition file (2) includes the UI object definition information as many as the UI objects included in the UI composed based on the UI definition file (2), in practice.

Each UI object definition information included in the UI definition file includes information indicating various attribute in relation to the UI object defined by the UI object definition information, as shown in the figure. The followings are examples of representative information included in the UI object definition information:

(1) type information of a component (UI object): information specifying a type, such as whether the UI object has a function of a button or key to receive user's operation, a text box function to display information, or function simply to display an image on the display unit 24;
(2) resource information used for the UI object: information defining an image and a text for displaying the UI object such as a key or button, which is a component of the UI to be displayed on the display unit 24;
(3) location information for arranging the UI object: information specifying where to display the UI object in a predetermined UI display area;
(4) information on display size of the UI object: information specifying a size of the UI object when displayed in the UI display area;
(5) operation condition information (action information) of the UI object: information specifying an operation to an application when there is input to the UI object (when there is input to a portion of the input unit 22 corresponding to the UI object, in practice) (For example, information defining to instruct the TV remocon application to send an infrared signal to turn a power of the TV, as the external equipment, on/off if an event to input to a UI object of "Power" of the TV remocon UI is occurred);
(6) information to enable or disable the UI object: information specifying whether to display the UI object in the UI display area or whether to activate the UI object;
(7) priority order information of the UI object: information indicating priority of the object based on a relationship between the UI object and other UI objects when a plurality of UIs are compounded; and
(8) relationship information between the UI object and another UI object: information, when the UI object has a predetermined relationship with another UI object, specifying the relationship.

Although there may be a variety of operation condition information (action information) of the UI object of the above (5), types of the action information are defined mainly as the following three types in the present embodiment.
1. An action to change a property (attribute information) of an UI object
2. An action to execute a function of an application
3. An action to activate a stand-alone UI In addition, the mobile phone 1 according to the present embodiment may select and adopt a plurality of UI objects from a plurality of UIs based on a user's selecting operation and display the plurality of UI objects as a compound UI in a single UI display area. In this case, although each UI has a corresponding UI definition file, the compound UI composed of the UI objects selected by the user originally has no corresponding UI definition file. Therefore, when the compound UI composed of the UI objects selected by the user is generated, the UI compound processing unit 60 generates and stores a compound UI definition file based on the compound UI. The following is a further description of an operation to generate the compound UI definition file.

Figure 3:
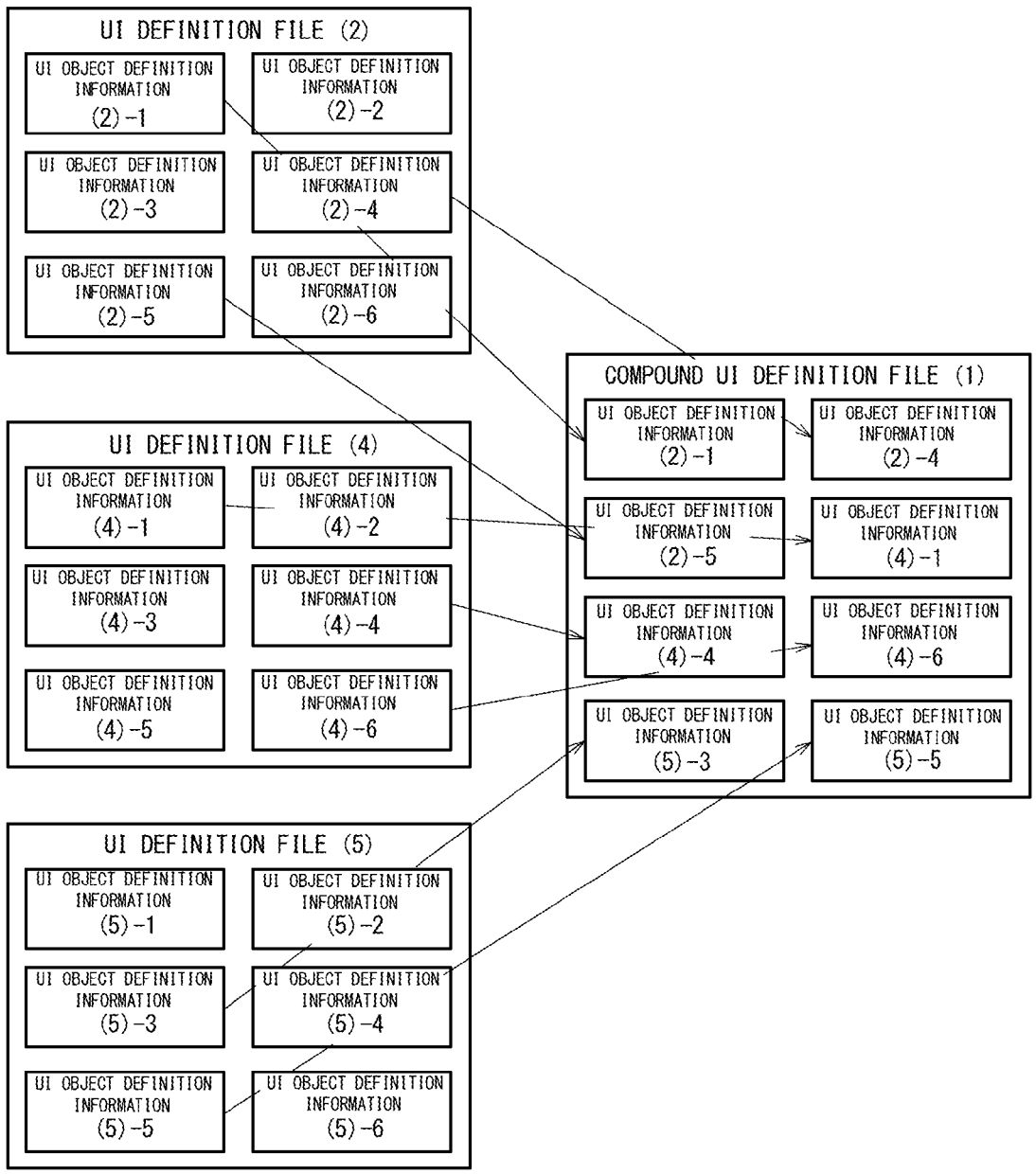
FIG. 3 is a conceptual diagram illustrating a structure of a compound user interface definition file according to the present invention.

FIG. 3 is a conceptual diagram illustrating a structure of the compound UI definition file. The compound UI definition file is a single UI definition file having extracted parts of the UI object definition information included in a plurality of UI definition files, collectively. It is to be noted that the UI object definition information included in the compound UI definition file is processed in a variety of manners, if necessary, when compounded after extracted from a stand-alone UI as a source. For example, information identifying that it is to define a compound UI or information identifying relevant application information are added. FIG. 3 shows an exemplary conceptual diagram illustrating a new compound UI definition file (1) generated by extracting and collecting some UI object definition information from each of the UI definition files (2), (4) and (5). When generating a compound UI definition file by extracting some UI object definition information from each UI object definition file as stated above, the UI compound processing unit 60 performs processing, if necessary, before compounding.

When a plurality of UIs are compounded, the UI object selection processing unit 62 of the UI compound processing unit 60 generates the UI object selection screen based on each UI definition file and extracts UI object definition information of the UI objects selected by the user. The UI compound processing unit 60 collects the UI object definition information extracted in the above manner. At this point, the compound UI definition file generation unit 63 generates a single compound UI definition file from the UI object definition information collected. This means that, from the user's point of view, some UI objects are selected from the plurality of UIs and a single compound UI is generated by adopting them. As stated above, when the compound UI definition file generation unit 63 generates the compound UI definition file, the UI compound processing unit 60 processes the UI object definition information, if necessary. The UI compound processing unit 60 then stores the compound UI definition file generated by the compound UI definition file generation unit 63 in the compound UI definition file memory area 56.

The following is a description of the UI generated based on the UI definition file, by using a particular example. FIGS. 4(A) and (B) illustrate exemplary displays of remocon application UN as exemplary stand-alone UIs (stand-alone user interface object groups) generated based on UI definition files as shown in FIG. 2 and FIG. 3. FIG. 4(A) shows an exemplary display of the TV remocon application UI (user interface object group) of the TV set, whereas FIG. 4(B) shows an exemplary display of the air conditioner remocon application UI (user interface object group). If the UI definition file is described in a UIML file format based on XML language, when a UI is generated by analyzing each UIML file, a UI for a single screen to fit in the predetermined UI display area of the display unit 24 is displayed. In the UI definition file of each UI, a variety of attribute is defined by the UI object definition information for the UI objects composing each UI.

The UI object selection processing unit 62 selects some UI objects from the stand-alone UI (stand-alone user interface object group) shown in FIGS. 4(A) and (B) based on a predetermined criterion. The UI compound processing unit 60 performs the above processing to generate the compound UI with those UI objects. Thereby, the compound UI definition file generation unit 63 may generate the compound UI definition file composing a single compound UI by selecting and adopting a plurality of UI objects.

According to the present embodiment, it is also possible that main UI objects among the UI objects are automatically selected when a plurality of UI are compounded to generate a compound UI. In this case, when the UI object selection processing unit 62 automatically selects the UI objects, (7) priority order information of the UI object stated above is used.

FIG. 5 is a diagram illustrating priority information of the UI object according to the present embodiment.

FIG. 5(A) shows a TV remocon UI, which is a stand-alone UI, displayed on the touch panel 20 based on the TV remocon UI definition file by activating only the TV remocon application by the mobile phone 1. In this figure, the UI display area on the touch panel 20 is conceptually divided into small areas shown by dashed lines corresponding to attribute information of each UI object. In addition, definition (UI identification information) to handle a plurality of UI objects as a single UI (user interface object group) is indicated with a tag of interface. With a value "TV1_interface", it may be specified that it is the UI of a remocon of TV1. The following is an exemplary list of respective UI object attribute information corresponding to the small areas (1) to (7) shown in FIG. 5(A).
Interface id="TV1_interface"
(1) ID="switch1" priority="0"
(2) ID="ch_select" priority="1"
(3) ID="volume" priority="1"
(4) ID="10key" priority="4"
(5) ID="timer" priority="3"
(6) ID="bilingual" priority="3"
(7) ID="title" priority="0"

According to the present embodiment, the priority of the UI object in each of the small areas (1) to (7) in the UI object attribute information is defined in advance as a priority value. In the example in FIG. 5, the UI objects with the priority value zero are essential objects (selected without fail), the UI objects with the priority value 1 are important objects, and the UI object with a greater priority value is less important. That is, for example, since the "Power" key in the small area (1) in FIG. 5(A) is an essential key, its priority value is zero. In addition, since the channel selection keys in the small area (2) and the volume adjusting keys in the small area (3) are important keys, their priority values are 1. In contrast, since numerical keys in the small area (4) can be substituted with the channel selection keys in the small area (2) and (3), its priority value is 4 to set the priority low. In addition, the priorities of a timer in the small area (5) and a language changing key in the small area (6) are not so high and thus their priority values are 3.

It is to be noted that a character string in the small area (7) is not a key to receive input by the user but a UI object representing a name of the TV remocon UI. Although a name of a UI like this is not essential when using the stand-alone UI, it improves visibility and thus is regarded as an essential UI object which should be displayed when the compound UI is generated in the present example.

FIG. 5(B) shows the air conditioner remocon UI alone, the stand-alone UI, displayed on the touch panel 20. The following is an exemplary list of respective UI object attribute information corresponding to the small areas (1) to (7) shown in FIG. 5(B). In order to enable to specify that the plurality of objects are all for a single UI of a remocon of the air conditioner 1, a value of a tag of interface is "AIR1_interface".
Interface id="AIR1_interface"
(1) ID="switch2" priority="0"
(2) ID="set_window" priority="0"
(3) ID="temp" priority="1"
(4) ID="win_velo" priority="1"
(5) ID="direction" priority="2"
(6) ID="mode" priority="3"
(7) ID="title" priority="0"

For the air conditioner remocon UI, the "Power" key shown in the small area (1) and the "Preset Temperature" are essential keys, for example, and thus their priority values are zero. In addition, temperature adjusting keys in the small area (3) and wind force keys in the small area (4) are important keys, and thus their priority values are 1. With lower priorities in comparison with those keys, wind direction adjusting keys in the small area (5) have a priority value 2 and a mode key in the small area (6) has a priority value 3. Although a character string in the small area (7) is not a key to receive input by the user but a UI object representing a name of the air conditioner remocon UI, it is regarded as an essential object which should be displayed in the present example.

As stated above, according to the present embodiment, information on the priority (priority value) defined based on a relationship between each UI object and other UI objects is included as the UI object attribute information in the UI object definition information of each UI definition file in advance. The information on the priority is used by the UI generation unit 13 to determine whether to adopt each UI object to a compound UI when performing automatic selection processing of the UI object in the UI compound processing. Since the UI display area on the display unit 24 is a limited area, UI objects with lower priorities are not adopted when the compound UI is generated. Instead, UI objects with higher priorities originally included in other UIs are adopted to the compound UI.

Next, operation to compound UIs of the plurality of applications according to the present embodiment is described with reference to flowcharts in FIGS. 6, 7 and 8.

Figure 6:
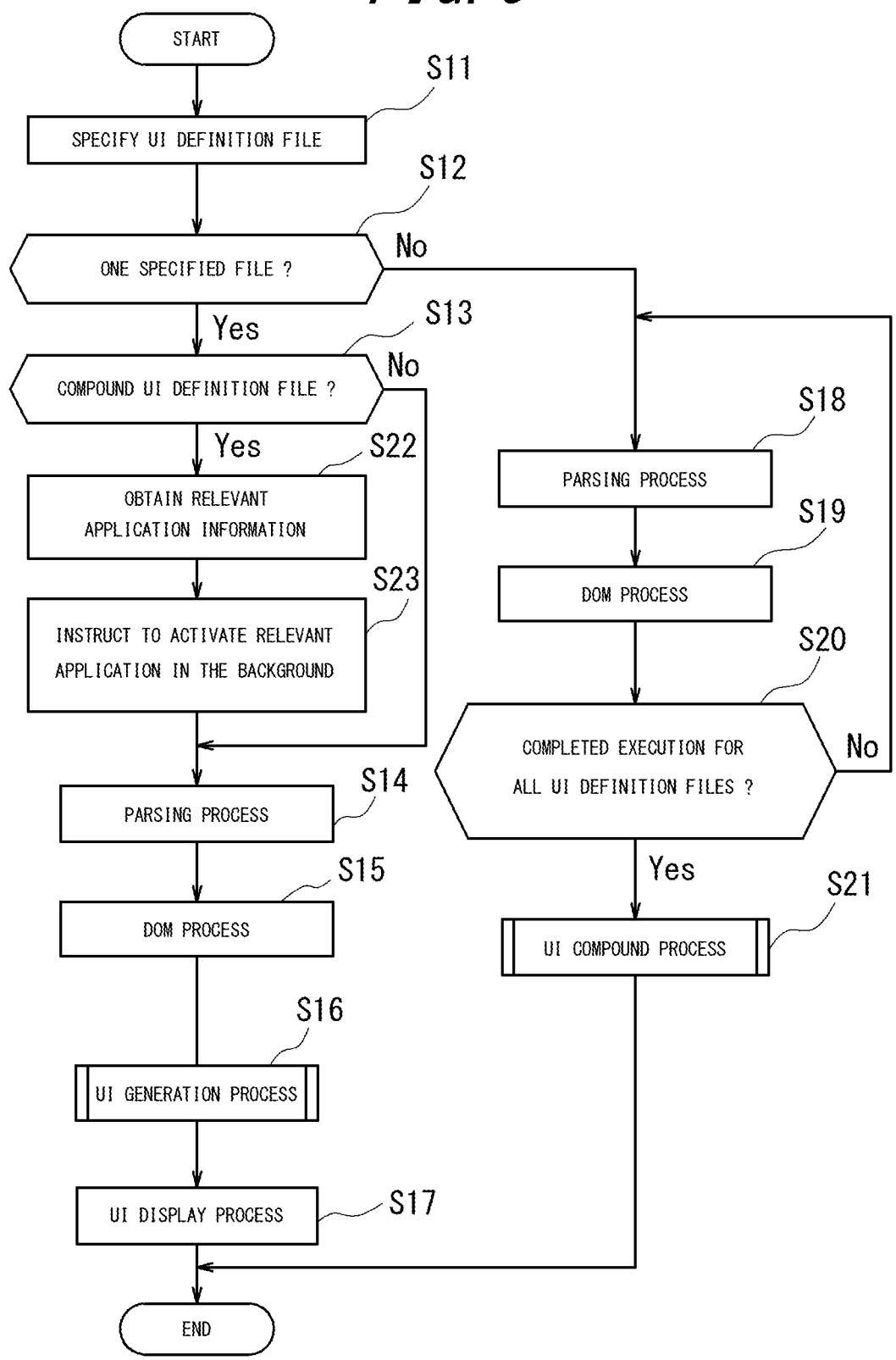
FIG. 6 is a flowchart of entire user interface generation processing according to the first embodiment.

FIG. 6 is a flowchart illustrating overall processing of the UI generation unit 13 to generate a UI from the UI definition file or the compound UI definition file and to enable the UI according to the present embodiment. First, when an application is activated based on operation input to the input unit 22 and the like by the user and the application execution unit 11 instructs to generate a UI related to the application, the processing to generate and enable the UI is started. When this processing is started, an application authorized to display the UI specifies the UI definition file (XML file) (step S11). Such application authorized to display the UI is not activated in the background of the mobile phone 1 but operating at the top of applications. An operation by the user to activate an application using the UI or an operation by the user to activate an application which uses the UI when another application is already being executed may be assumed as a trigger to start this processing.

Next, the UI generation unit 13 determines whether the number of UI definition file specified at step S11 is one or more (step S12). If it is determined that the number of UI definition files specified is one, the UI generation unit 13 determines that the application giving the instruction does not require to compound a plurality of UIs and the processing proceeds to step S13. At step S13, the UI generation unit 13 reads out the UI definition file specified from the UI definition file memory area 52 or the compound UI definition file memory area 56 and determines whether the UI definition file is a compound UI definition file.

At step S13, if it is determined that the UI definition file specified is not the compound UI definition file, that is, determined that the UI definition file specified is a UI definition file of a stand-alone UI read out from the UI definition file memory area 52, the processing proceeds to step S14.

At step S14, the UI generation unit 13 performs the XML parsing process on the UI definition file of the stand-alone UI specified, and then the DOM process thereon (step S15). If the UI definition file specified is the UI definition file of the stand-alone UI as described above, processing thereafter is the same as a conventional processing to generate a UI. That is, the UI generation unit 13 performs the UI generation process based on the UI definition file on which the parsing process and the DOM process have performed (step S16). The UI generation process at step S16 will be described below. Next, based on the UI of the XML file generated by the UI generation processing, the UI generation unit 13 performs processing to display the UI in the UI display area of the display unit 24 on the touch panel 20 (step S17). Thereby, the stand-alone UI becomes usable in the mobile phone 1.

In contrast, at step S12, if the number of the files specified at step S11 is two or more, the UI generation unit 13 determines that the application requires to compound a plurality of UIs and performs the XML parsing process (step S18) and the DOM process (step S19) on each of the plurality of XML files. At step S20, the UI generation unit 13 determines whether the parsing process and the DOM process are completed for all of the UI definition files and, if it is not completed, the UI generation unit 13 returns to step S18 to perform the parsing process and the DOM process on UI definition files unprocessed.

At step S20, if it is determined that the parsing process and the DOM process are completed for all of the UI definition files, the UI compound processing unit 60 performs processing to compound the plurality of UIs on which the parsing process and the DOM process have performed (step S21). That is, the UI generation unit 13 instructs to generate (compound) the plurality of UIs. The UI compound processing at step S21 will be described below.

When the UI compound processing is performed at step S21, the compound UI definition file generation unit 63 generates a compound UI definition file of the UI compounded. Then, the entire processing ends once, and if the processing restarts using the compound UI definition file generated here, a compound UI definition file is specified at step S11. Accordingly, it is determined at step S12 that one file is specified, whereas it is determined at step S13 that the compound UI definition file is specified.

As described above, if it is determined that the file specified is the compound UI definition file at step S13, the processing proceeds to step S22. In this case, if a compound UI, generated (prepared) as the compound UI definition file, is activated and actually used, it is necessary to display UI objects as one compound UI (compound user interface object group) on the display unit 24 such that the UI objects are usable. Therefore, the UI generation unit 13 obtains relevant application information stored in association with a corresponding compound UI definition file from the relevant application information memory area 55 of the memory unit 50 (step S22). Next, based on the relevant application information obtained, the UI generation unit 13 instructs the application execution unit 11 to activate a relevant application in the background (step S23).

Thereafter, the processing proceeds to step S14 to perform the same processing as that for the UI definition file of the stand-alone UI. That is, the UI generation unit 13 performs the XML parsing process (step S14) and the DOM process (step S15) on the specified UI definition file of the compound UI. In addition, based on the specified UI definition file of the compound UI, the UI generation unit 13 performs processing to generate the compound UI (step S16). Then, the UI generation unit 13 performs processing to display the compound UI generated in the UI display area on the display unit 24 of the touch panel 20 (step S17) and then ends an entire compound UI generation process.

Next, the UI generation process at step S16 in FIG. 6 is further described with reference to the flowchart in FIG. 7. It is to be noted that the UI generation process at step S16 is a narrowly-defined UI generation process, that is, process to analyze the UI definition file and to enable the UI to be displayed on the display unit 24 based on a result of such analysis.

Figure 7:
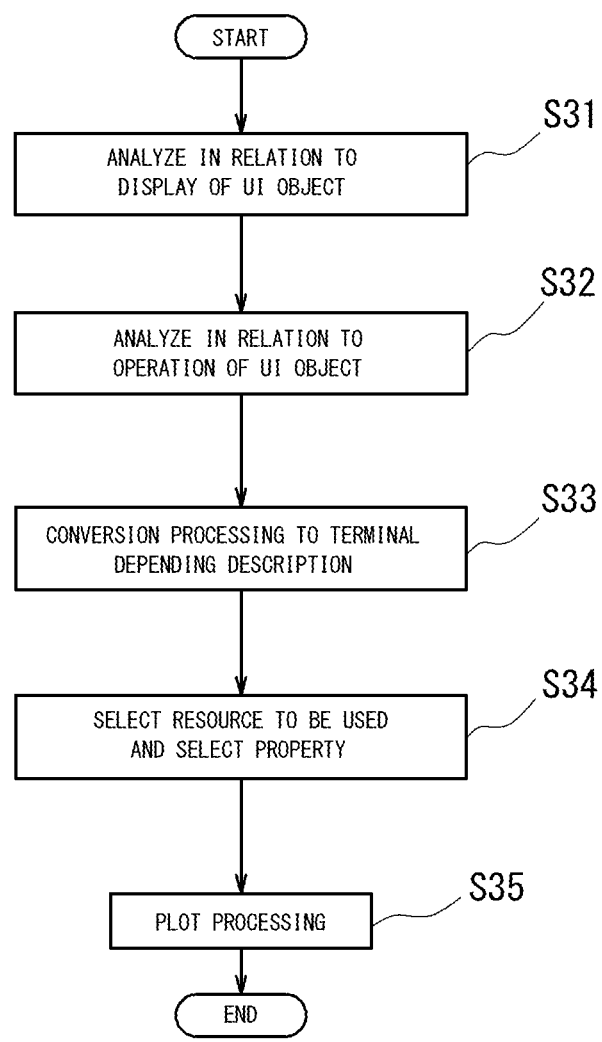
FIG. 7 is a flowchart of user interface generation processing according to the first embodiment.

At start of the UI generation processing in FIG. 7, either one stand-alone UI or one compound UI based on the UI definition file specified is formed as one DOM document (or DOM node). First, the UI generation unit 13 performs analysis in relation to display of the DOM document (step S31). For the UI definition file described in the UIML form, attributes with structure tag and style tag are analyzed. Next, the UI generation unit 13 performs analysis in relation to operation of the DOM document (step S32). For the UI definition file described in the UIML form, attribute with behavior tag and the like are analyzed.

Next, the UI generation unit 13 performs conversion processing of an expression included in the DOM document into a description dependent on each terminal (step S33). Moreover, the UI generation unit 13 selects a resource of the UI object to be used based on a result of the conversion processing at step S33 and sets each attribute (property) (step S34). The resource of the UI object necessary at this time is stored as the individual UI resource in the individual UI resource memory area 53 or as the common UI resource in the common UI resource memory area 54. Subsequently, the UI generation unit 13 performs plot processing of the UI including the UI objects (step S35). Thereby, the UI generation processing ends and the UI generation unit 13 proceeds to step S17 in FIG. 6 to perform a UI display processing.

By this processing, the mobile phone 1 can display the stand-alone UI on the display unit 24 based on the UI definition file of the stand-alone UI along with an execution of an application using the stand-alone UI. For example, if the UI definition file for the TV remocon is specified by the application alone of the TV remocon, the UI is displayed as shown in FIG. 4(A) as described above. If the UI definition file for the air conditioner remocon is specified by the application alone of the air conditioner remocon, the UI is displayed as shown in FIG. 4(B). It is also possible to display the compound UI on the display unit 24 based on the compound UI definition file along with the execution of the application using the compound UI.

Next, the UI compound processing at step S21 in FIG. 6, that is, processing performed when it is instructed to generate a plurality of UIs is further described with reference to the flowchart in FIG. 8.

Figure 8:
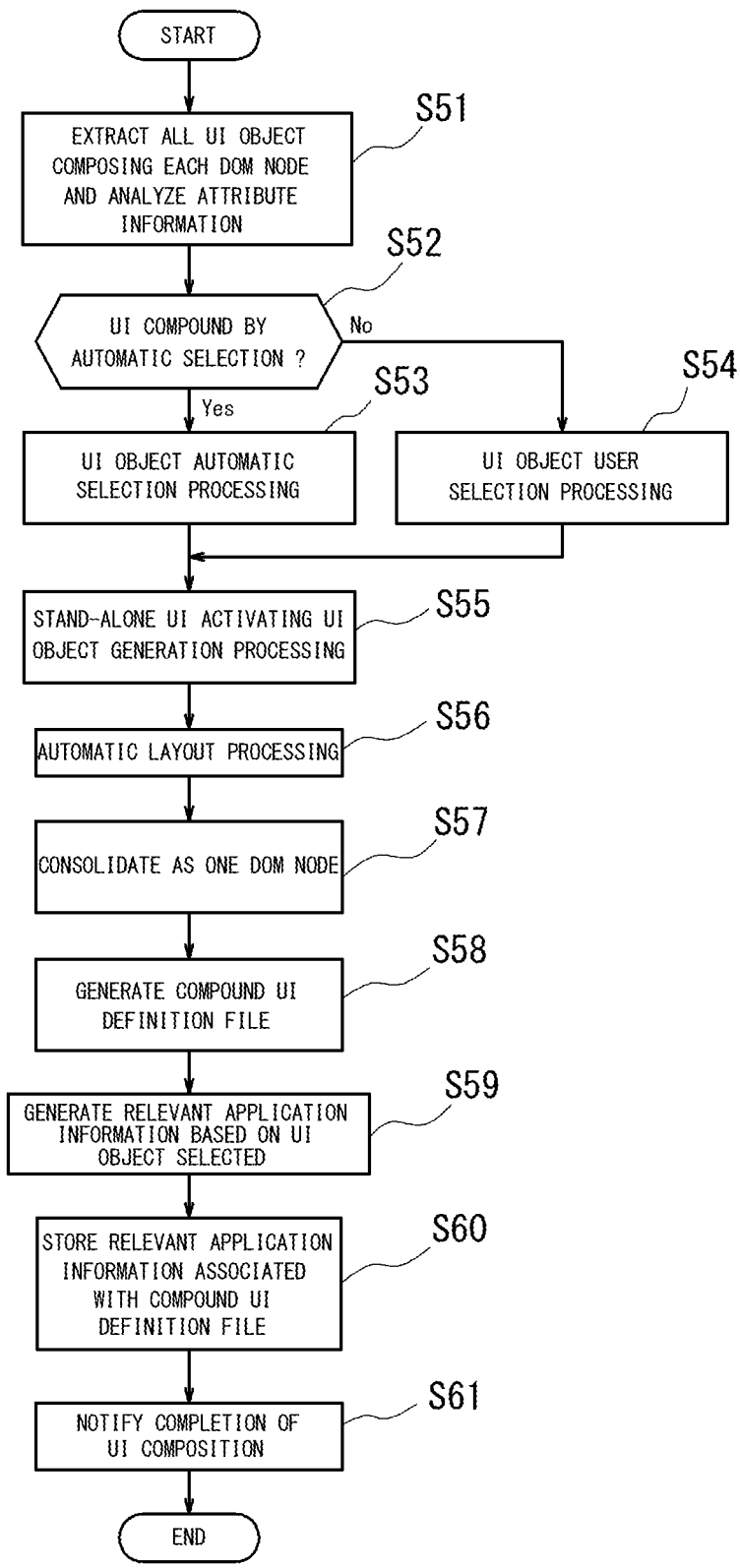
FIG. 8 is a flowchart of user interface compound processing according to the first embodiment.

When the UI compound processing shown in FIG. 8 is started, the UI compound processing unit 60 extracts all UI objects composing each DOM node for DOM node of the plurality of UIs for which the parsing process and the DOM process are completed and analyzes attribute information of each UI object (step S51). As shown in FIG. 2, there is various attribute information of each UI object to be analyzed, including the priority information (priority) of the UI object.

After analysis of the attribute information of all of the UI objects, the UI compound processing unit 60 determines whether the automatic selection is specified for selecting (extracting) UI objects, from the UI objects extracted, to be adopted to the compound UI (step S52).

If the automatic selection is instructed for the UI compounding at step S52, the UI object selection processing unit 62 performs UI object automatic selection processing (step S53). Thereby, the UI objects to be adopted as UI objects composing the compound UI are automatically extracted. In the UI object automatic selection processing, the UI object selection processing unit 62 automatically selects (extracts) the UI objects based on a predetermined rule such as to adopt UI objects, to the compound UI, with priority 0-2 as the priority information of the attribute information analyzed for each UI object.

In contrast, if the automatic selection is not instructed for the UI compounding at step S52, the UI object selection processing unit 62 performs the UI object selection processing by the user (step S54). Thereby, UI objects to be adopted as UI objects composing the compound UI are extracted based on selection by the user. In the UI object selection processing by the user, the UI objects selected by the user based on operation input by the user are adopted to the compound UI (extracted as objects to be adopted). In this case, it is preferred that the UI object selection processing unit 62, on the UI object selection screen, accumulates a total occupancy of the UI objects selected in the UI display area such that UI objects which cannot fit in the UI display area will not be selected (extracted).

When the UI object selection processing by the automatic selection or user selection in those manners is completed, the stand-alone UI activating UI object generation unit 66 performs processing to generate a stand-alone UI activating UI object as a UI object to be included in the compound UI (step S55).

According to the present embodiment, in the stand-alone UI activating UI object generation processing at step S55, a new UI object is generated for switching from the compound UI to the stand-alone UI with a simple operation.

When the stand-alone UI activating UI object generated at step S55 is newly added to the UI objects already selected, the stand-alone UI activating UI object generation unit 66 defines the type of attribute information of this UI object as one, such as "button", to receive user operation. In addition, the stand-alone UI activating UI object generation unit 66 describes information (for example, a name of the UI definition file of the stand-alone UI) defining the UI definition file of the stand-alone UI to be activated, as action information included in the operation condition of the attribute information of the UI object.

When all UI objects including the stand-alone UI activating UI object to be adopted to the compound UI are selected (extracted), the automatic layout processing unit 64 then performs processing to visually arrange the UI objects selected (extracted) in the UI display area (step S56). At this point, the UI resource shaping unit 65 adjusts display sizes of the UI objects selected, if necessary. In addition, the automatic layout processing unit 64 sets suitable margins (blank space) around the UI objects in order to prevent the UI objects from being located too close to one another.

When the arranging processing of the UI objects selected is completed, the UI compound processing unit 60 consolidates the UI objects in a confirmed layout as one DOM node (step S57). Next, the compound UI definition file generation unit 63, based on the UI object definition information of the UI objects selected, generates the compound UI definition file defining the compound UI composed of the UI objects selected (step S58). The compound UI definition file generated thereby is stored as a file in the XML form in the compound UI definition file memory area 56 of the memory unit 50.

When the compound UI definition file is generated at step S58, the UI compound processing unit 60, based on the UI objects selected (extracted) for the compound UI, generates relevant application information (step S59). The relevant application information generated here is information for controlling an application related to the UI object, when the user inputs to the UI object selected (extracted) for the compound UI. When the relevant application information based on the UI objects selected is generated, the UI compound processing unit 60 associates the relevant application information with the compound UI definition file and then stores the relevant application information in the relevant application information memory area 55 (step S60). Then, the UI compound processing unit 60 notifies the application execution unit 11 of completion of the UI compound processing (step S61) and ends the UI compound processing.

By this processing, the compound UI generated (compound user interface object group) can be displayed immediately on the display unit 24. It is also possible not to immediately use the compound UI generated but read out and use the compound UI definition file stored in the compound UI definition file memory area 56 later.

Through the entire UI generation processing described with reference to FIG. 6 after the above UI compound processing, it is possible to generate the compound UI composed of the UI objects selected (extracted) from the stand-alone UIs. For example, by using the UI objects selected from the remocon application UI of the TV set shown in FIG. 4(A) and the remocon application UI of the air conditioner shown in FIG. 4(B), it is possible to generate a compound UI (compound user interface object group) as shown in FIG. 9.

Figure 9:
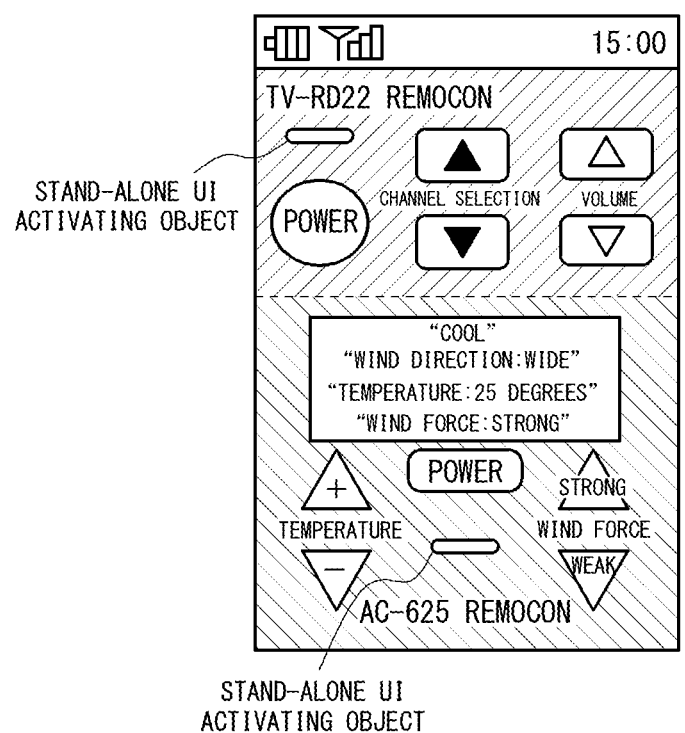
FIG. 9 is a diagram illustrating exemplary compound of two stand-alone user interfaces by the user interface compound processing according to the first embodiment.

The compound UI (compound user interface object group) shown in FIG. 9 is an example of a compound UI when the UI object selection processing unit 62 automatically selects UI objects based on a criterion to adopt the UI objects with priority values (priority) 0-2 of the UI object attribute information to the compound UI at step S53 in FIG. 8. The compound UI shown in FIG. 9 divides the UI display area of the touch panel 20 into an upper area in which the UI objects selected from the TV remocon UI are arranged and a lower area in which the UI objects selected from the air conditioner remocon UI are arranged.

As described above, according to the present embodiment, a plurality of UIs are compounded by analyzing two XML files, extracting only UI objects with high priorities and automatically arranging them. Thereby, the user can simultaneously use the plurality of UIs as one compound UI without switching UIs based on a plurality of applications or a corresponding application.

However, generation of a compound UI with the UI objects selected from the stand-alone UIs as shown in FIG. 9 leaves some UI objects unselected. Therefore, there may be a case in which a UI object of the stand-alone UI desired by the user is not selected for the compound UI generated. To deal with such a case, the stand-alone UI activating UI object (referred simply to as a "stand-alone UI activating object" as well) generated at step S55 in FIG. 8 is arranged in each of the TV remocon UI in the upper area of the compound UI in FIG. 9 and the air conditioner remocon UI in the lower area of the compound UI.

The attribute information of the stand-alone UI activating object includes information, as action information, for specifying the UI definition file of the stand-alone UI to be activated. Accordingly, it is possible to easily switch to an original stand-alone UI including surrounding UI objects in response to user input to the stand-alone UI activating object. For example, based on input to the stand-alone UI activating object included in the TV remocon UI in the upper area of the compound UI shown in FIG. 9, it is possible to switch to the TV remocon UI as the stand-alone UI as shown in FIG. 4(A). In addition, it is also possible, based on input to the stand-alone UI activating object included in the air conditioner remocon UI in the lower area of the compound UI shown in FIG. 9, to switch to the air conditioner remocon UI as the stand-alone UI as shown in FIG. 4(B).

In order to achieve such operation, according to the present embodiment, while the compound UI is in use, a "stand-alone UI switching processing", which enables to switch to the original stand-alone UI easily, is included in the processing performed when the event such as operation input by the user is occurred to the compound UI.

Figure 10:
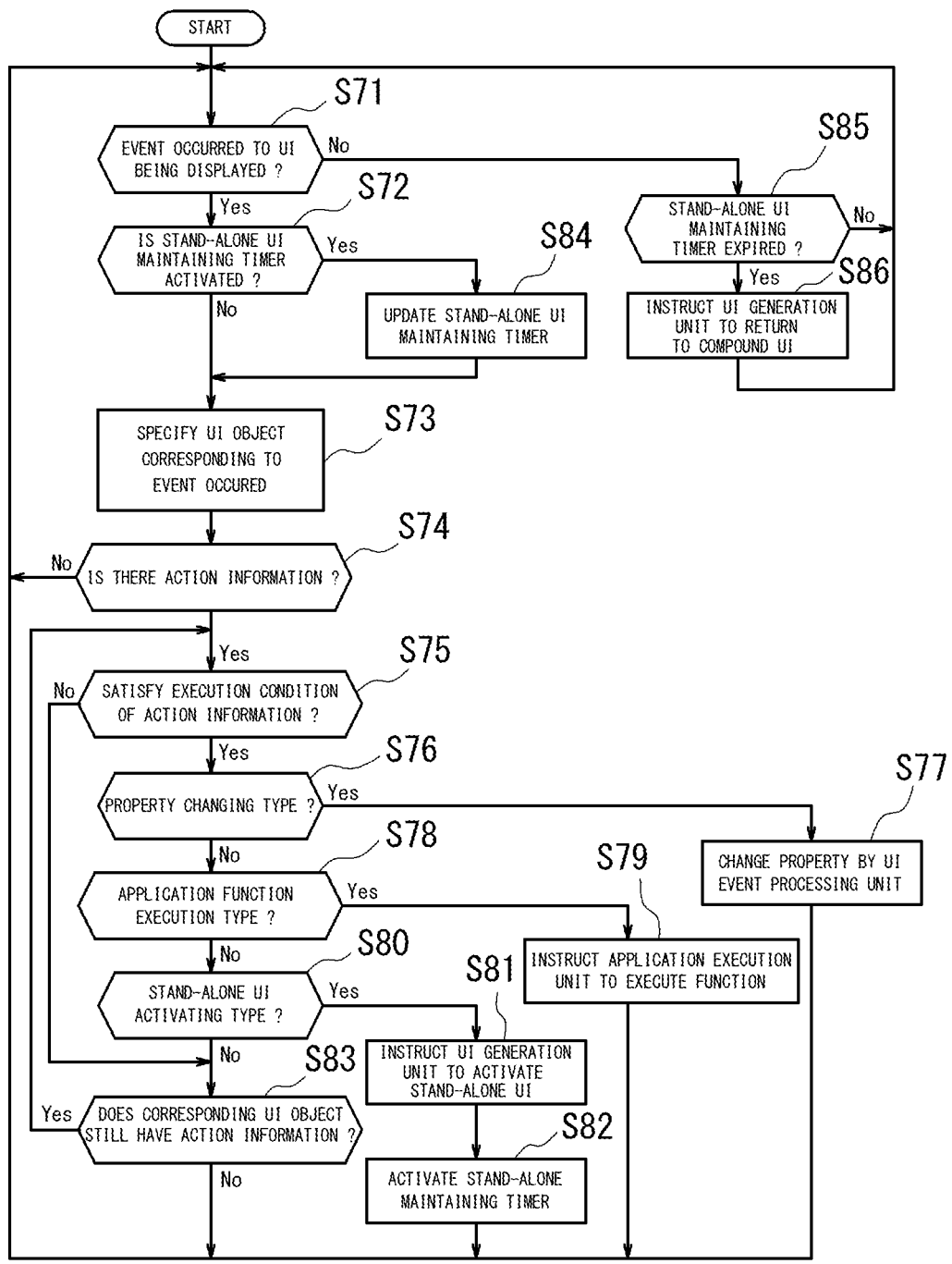
FIG. 10 is a flowchart of processing performed when an event is occurred to a user interface according to the first embodiment.

The following is a description of a processing (UI event processing), performed when an even is occurred to the UI while the compound UI is in use, with reference to a flowchart shown in FIG. 10.

The UI event processing is started when an event such as operation input to the input unit 22 by the user is occurred and the UI event processing unit 15 is notified of information on occurrence of the event. As shown in FIG. 10, when the UI event processing is started, the UI event processing unit 15 first determines whether the event is an event to the UI currently being displayed on the display unit 24 (step S71). That is, it is determined whether the operation input to the input unit 22 by the user is occurred not in a part where the UI is not displayed but in a part where the UI is displayed.

If the event is the event to the UI currently being displayed, the UI event processing unit 15 determines whether a stand-alone UI maintaining timer of the timer unit 14 is being activated (step S72). Here, the stand-alone UI maintaining timer is a function to time an activation time of the stand-alone UI from when the stand-alone UI switched from the compound UI. If the processing is started from when the event is occurred to the compound UI, the stand-alone UI maintaining time is not activated, thus the processing proceeds to a next step S73.

At step S73, the UI event processing unit 15 compares a position where the event is occurred on the input unit 22 and a position of the UI object being displayed in the display unit 24 and specifies to which UI object the event is occurred. According to the present embodiment, since the input unit 22 constitutes the touch panel 20, the UI event processing unit 15 specifies the UI object currently being displayed at a coordinate where the operation input is received. At this point, the UI event processing unit 15 also performs a basic operation of the UI object in accordance with the type of the UI object specified. That is, for example, the UI event processing unit 15 performs to display a character input if the UI object received the input is of the type such as keys to receive character input, or performs to scroll the display if the UI object received the input is of the type for receiving scroll operation.

When the UI object to which the event is occurred is specified at step S73, the UI event processing unit 15 determines whether the UI object definition information of the UI object specified includes the action information as operation condition information of the above (5) (step S74). If the UI object definition information of the UI object specified does not include the action information, it means that the UI object is not for receiving input, and thus the UI event processing unit 15 returns to step S17 to wait for a next input.

In the UIML form, it is also possible to describe a plurality of action information for one UI object. For example, when there is an input to the UI object representing a key by the user, it may describe a plurality of action information such as an action to reverse display of the key for a moment, an action to activate an application in response to the input to the key, and the like.

If the action information is included at step S74, the UI event processing unit 15 determines whether the event occurred satisfies an execution condition of the action information included in the UI object definition information of the UI object (step S75). If the event occurred does not satisfy the execution condition of the action information included in the UI object definition information, the UI event processing unit 15 proceeds to step S83 to determine whether the UI object still has another action information. If the UI object specified includes a plurality of action information, the UI event processing unit 15 returns to step S75 to determine whether the other action information satisfies the execution condition of the action information included in the UI object definition information of the UI object. In contrast, if the UI object specified has no more action information at step S83, that is, if processing in accordance with all action information of the UI object is completed, the UI event processing unit 15 returns to step S71 to wait for a next input.

If the event occurred satisfies the execution condition of the action information included in the UI object definition information at step S75, the UI event processing unit 15 performs processing of the action information which satisfies the execution condition, in accordance with the type of the UI object (step S76 to step S82).

In process after step S76, in particular, if the action information is of a type to change a property of a UI object (YES of step S76), the UI event processing unit 15 changes property information of the UI object (step S77). That is, in this case, the UI event processing unit 15 changes property such as, for example, a resource used by the UI object specified (an image used as the button, for example), an arrangement position of the UI object, a display size of the UI object and the like.

If the action information is of a type to execute a function of an application (YES of step S78), the UI event processing unit 15 instructs the application execution unit 11 to execute the function of the application (step S79). In this case, the UI event processing unit 15, in accordance with the action information, instructs the application execution unit 11 to execute a function specified in the action information.

In addition, if the action information is of a type to activate the stand-alone UI, that is, the stand-alone UI activating object (YES of step S80), the UI event processing unit 15 instructs the UI generation unit 13 to activate a corresponding stand-alone UI (step S81). In this case, if there is input to the stand-alone UI activating object included in the TV remocon UI of the compound UI (compound user interface object group) shown in FIG. 9, the UI event processing unit 15 instructs to switch to a stand-alone TV remocon UI (stand-alone user interface object group) shown in FIG. 4). In addition, if there is input to the stand-alone UI activating object included in the air conditioner remocon UI of the compound UI shown in FIG. 9, the UI event processing unit 15 instructs to switch to a stand-alone air conditioner remocon UI (stand-alone user interface object group) shown in FIG. 4(B).

After instructing the UI generation unit 13 to activate the stand-alone UI at step S81, the UI event processing unit 15 subsequently activate the stand-alone UI maintaining timer of the timer unit 14 (step S82). Thereafter, the UI event processing unit 15 returns to step S71 to continue the processing. If there is no event to the stand-alone UI being displayed at step S71, that is, if there is no input by the user, the UI event processing unit 15 determines whether the stand-alone UI maintaining timer being activated has counted over a predetermined period and the period has past (step S85). At step S85, if the predetermined period of the stand-alone UI maintaining timer has not passed yet, the UI event processing unit 15 returns to step S71. In contrast, if the predetermined period of the stand-alone UI maintaining timer has passed at step S85, the UI event processing unit 15 instructs the UI generation unit 13 to return from the current stand-alone UI to the compound UI before switchover to the stand-alone UI (step S86).

Accordingly, if there is input to the stand-alone UI activating object in the compound UI shown in FIG. 9, the display switches to the stand-alone UI shown in FIG. 4(A) or (B), and the display returns to the previous compound UI shown in FIG. 9 if there is no input for the predetermined period after the stand-alone UI is displayed.

In addition, if there is an event to the stand-alone UI being displayed at step S71, that is, there is input by the user, the UI event processing unit 15 determines whether the stand-alone UI maintaining timer is being activated (step S72). Since the stand-alone UI maintaining timer is activated during activation of the stand-alone UI after switchover from the compound UI, the UI event processing unit 15, in this case, updates an end of the predetermined period for the stand-alone UI maintaining timer to count (step S84) and then proceeds to a next step S73.

Accordingly, when the stand-alone UI shown in FIG. 4(A) or (B) is activated from the compound UI shown in FIG. 9, for example, the display returns to the previous compound UI after the predetermined period with no input, whereas a period to display the stand-alone UI is extended if there is input to the stand-alone UI.

As stated above, according to the present embodiment, it is possible to easily switch to the stand-alone UI, which is an original of the compound UI, by operation input to the compound UI. In addition, after switchover from the compound UI to the stand-alone UI, the stand-alone UI maintains to be displayed in accordance with a time for which the stand-alone UI is used. Moreover, it is possible to return to the previous compound UI by leaving the stand-alone UI for the predetermined period.

Second Embodiment

Next, a stand-alone UI switching processing according to a second embodiment of the present invention is described. According to the present embodiment, the stand-alone UI activating UI object generation processing performed at step S55 in FIG. 8 in the above first embodiment is changed.

According to the above first embodiment, a new UI object is generated to switch from the compound UI to the stand-alone UI. However, according to the second embodiment, a function (action information) to switch from the compound UI to the stand-alone UI is added to an existing UI object included in the stand-alone UI.

In order to do this, at the stand-alone UI activating object generation processing performed at step S55, a UI object selected (extracted) at step S53 or S54 are processed into the stand-alone UI activating object.

According to the present embodiment, the UI object of the type not to receive user operation is changed into the UI object, such as buttons, of the type to receive user operation, in order to use the UI object as the stand-alone UI activating UI object. For example, the UI object of an "image" only to display is changed to the UI object of the "button" to receive user operation, thereby the same image data are used without changing a resource used while a function as the button is added to the image. That is, according to the present embodiment, the stand-alone UI activating UI object generation unit 66 associates an action to switch the display to the stand-alone UI as a new action with any of the existing UI objects. In this case, particularly, an UI object having no action associated therewith among the existing UI objects extracted is associated with the action to switch the display to the stand-alone UI as the new action. In addition, according to the present embodiment, the action information included as the operation condition describes information to specify the UI definition file of the stand-alone UI to be activated (for example, a name of the UI definition file of the stand-alone UI). Accordingly, since the new action is added to the existing UI object, the UI event processing unit 15 can perform processing to activate the stand-alone UI based on the new action when input to the UI object by the user is detected.

Figure 11:
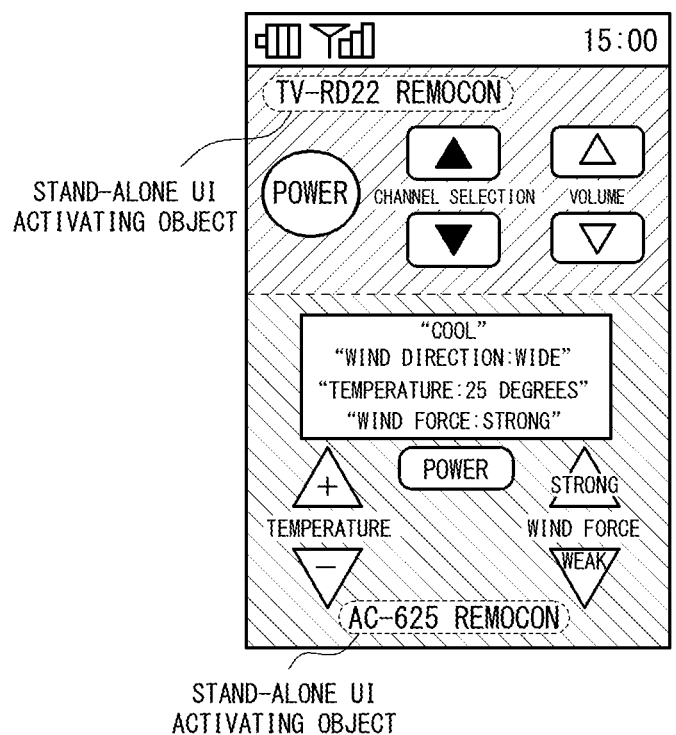
FIG. 11 is a diagram illustrating exemplary compound of two stand-alone user interfaces by the user interface compound processing according to a second embodiment.
Figure 14:
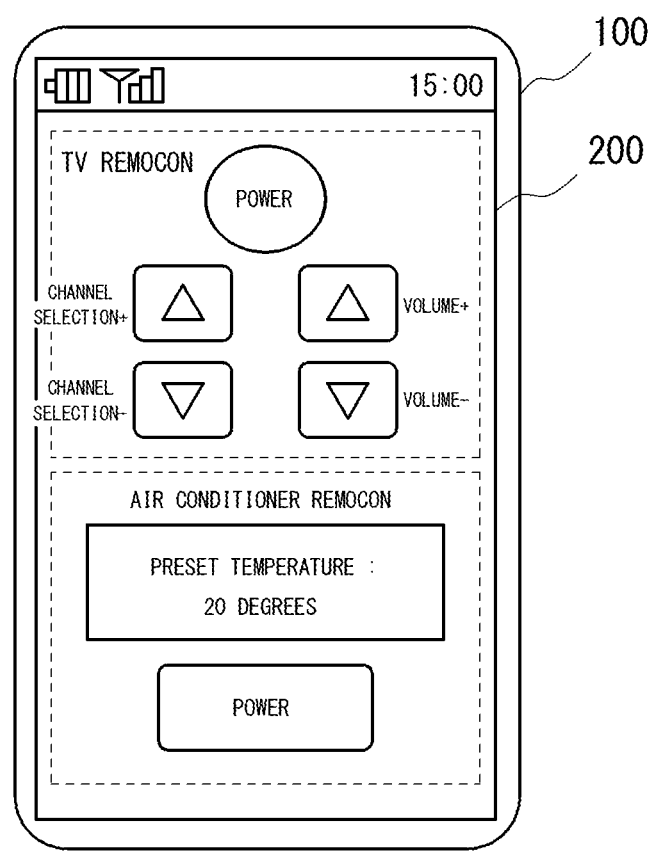
FIG. 14 is a diagram exemplifying compound of two stand-alone user interfaces by the mobile terminal.

FIG. 11 shows a diagram illustrating an example in which the stand-alone UI activating object generation processing according to the present embodiment is performed and then the compound UI is generated by compounding the stand-alone UIs. In the compound UI (compound user interface object group) shown in FIG. 11, a function as the button to receive operation input by the user as the stand-alone UI activating object is added to an UI object for only displaying a name of an application when the stand-alone UI is used. For example, if input is received as the user touches a part of the display showing "TV-RD22 remocon" shown in FIG. 11, the UI event processing unit 15 switches the UI to the stand-alone TV remocon UI (stand-alone user interface object group) shown in FIG. 4(A). If input is received as the user touches a part of the display showing "AC-625 remocon" shown in FIG. 11, the UI event processing unit 15 switches the UI to the stand-alone air conditioner remocon UI (stand-alone user interface object group) shown in FIG. 4(B).

As stated above, according to the present embodiment, the UI object not to receive operation input by the user on the stand-alone UI functions as the UI object of the button, on the compound UI, to receive operation by the user to switch to the stand-alone UI, and thereby the event when the button is pressed down can be processed.

It is to be noted that the UI object processed into the stand-alone UI activating object is not limited to the UI object to show the name of the application when the stand-alone UI is in use. The processing according to the present embodiment can be performed by processing any UI object, such as a background image excluding a button, other than UI objects originally prepared as the stand-alone UI activating objects.

Third Embodiment

Next, the stand-alone UI switching processing according to a third embodiment of the present invention is described. According to the present embodiment, similar to the above second embodiment, the stand-alone UI activating UI object generation processing performed at step S55 in FIG. 8 is changed.

According to the above second embodiment, the function to switch from the compound UI to the stand-alone UI is added to a UI object included in an existing stand-alone UI and selected in the compound UI. However, according to the third embodiment, a function to switch from the compound UI to the stand-alone UI when receiving input in a manner different from an existing input manner is added to an existing UI object to receive input on the stand-alone UI.

In order to do this, in the same manner as the second embodiment, in the stand-alone UI activating object generation processing at step S55, a UI object selected (extracted) at step S53 or S54 is processed. At this point, the function (action information) to switch from the compound UI to the stand-alone UI when receiving input in the manner different from the existing manner is added to the existing UI object included in the stand-alone UI. For example, if the UI object to be processed into the stand-alone UI activating object is of a type as "button" and the action information defines an input manner of "short press" as a normal input, an input manner of "long press" is defined in association with an execution condition of the action to activate the stand-alone UI. That is, the stand-alone UI activating UI object generation unit 66 associates the action to switch the display to the stand-alone UI as an additional action with any of the existing UI objects extracted. Thereby, when an event corresponding to the operation condition defined by the action information is occurred, the UI event processing unit 15 can process the event based on the action information. It is to be noted that "long press" means an input regarded when an inputting state is maintained by the user for a predetermined period, whereas "short press" means an input when the inputting state is released before determined as "long press".

The following is a description of a case to add the action to activate the stand-alone UI to each of two "Power" buttons in the compound UI (compound user interface object group) shown in FIG. 11. In this compound UI, it is assumed that input to the power button in the "short press" manner is originally assigned with a function to turn respective equipment on/off. That is, the user can turn equipments on/off as a normal operation by "short pressing" the power buttons, respectively. According to the present embodiment, input to the UI object of the power button of each of equipments in the "long press" manner is associated with the action to activate respective stand-alone UI, for example.

Thereby, if receiving "short press" input to the "Power" button of the compound UI of the TV and the air conditioner shown in FIG. 11, the UI event processing unit 15 executes the function to turn the respective equipment on/off. In contrast, if receiving "long press" input to the power button at the side of the TV remocon in the compound UI shown in FIG. 11, the UI event processing unit 15 switches the display to the stand-alone TV remocon UI (stand-alone user interface object group) shown in FIG. 4(A). If receiving "long press" input to the power button at the side of the air conditioner remocon in the compound UI shown in FIG. 11, the UI event processing unit 15 switches the display to the stand-alone air conditioner remocon UI (stand-alone user interface object group) shown in FIG. 4(B).

According to the present embodiment, the function to activate the stand-alone UI by input in the manner different from the existing manner is added to a UI object. Accordingly, the action information corresponding to the input manner to activate the stand-alone UI is prevented from overlapping with the action information defining a normal input manner originally held by the UI object. For example, if the UI object which originally distinguishes functions to execute by the input manners "short press" and "long press", an input manner (such as double-clicking, for example) other than "short press" and "long press" is defined as the input manner corresponding to the action information for activating the stand-alone UI.

It is to be understood that the present invention is not limited to the embodiments set forth above, and various modifications and changes may be implemented. For example, according to the first embodiment, the necessary number of the stand-alone UI activating objects corresponds to the number of stand-alone UIs used for generating a compound UI. However, there may be a case in which, such as when the compound UI generated includes most of the UI objects composing the original stand-alone UI, it is not so necessary to return to the stand-alone UI. In this case, it is possible to reduce the number of stand-alone UI activating objects generated when the compound UI is generated, by omitting the stand-alone UI activating object for such UI.

In addition, although the mobile phone 1 remotely controls the external equipments with infrared communication by the infrared communication unit 40 in each of the embodiment set forth above, it is also possible to employ Near Field Communication such as Bluetooth (registered trademark), wireless LAN or the like, for example, for communication with the external equipments.

Although the UI object attribute information is included in the UI object definition information in each of the above embodiments, the UI object attribute information may not be included in the UI object definition information. For example, the UI object attribute information may be stored in association with corresponding UI object definition information in an area different from an area of the memory unit 50 in which the UI object definition information is stored.

In addition, the UI object attribute information may not be defined in a state where contents thereof are fixed. That is, for example, the control unit 10 may dynamically change the contents of the UI object attribute information based on a usage history of the UI and the like.

Moreover, the UI object attribute information may not be defined in advance. That is, the control unit 10 may analyze the UI definition file stored in the memory unit 50 and generate the UI object attribute information based on contents of the UI object definition information included in the UI definition file, a relation between the UI object definition information, the usage history of the UI and the likes.

The operation by the user to activate an application using the UI or the operation by the user to activate an application which uses the UI when another application is already being executed are taken as trigger to start the UI generation processing in each of the above embodiments. However, operations to trigger the UI generation processing are not limited thereto.

In each of the above embodiments, for example, the mobile phone 1 as the UI generation apparatus may obtain information on the external equipments near the UI generation apparatus by Near Field Communication such as wireless LAN, Bluetooth and the like or an RF tag reader and generate the UI based on the information obtained. That is, in this case, the mobile phone 1 may automatically generate the UI (UI for a remocon application to operate the external equipment) in relation to external equipment near the mobile phone 1 by detecting the external equipment, without operations by the user.

In addition, in each of the above embodiments, the mobile phone 1 as the UI generation apparatus may select a UI to generate, based on location information obtained by GPS and the like and time information. That is, in this case, the mobile phone 1 may automatically generate UI currently necessary at a current place, based on change in a current location, a schedule made in advance and the like.

Moreover, although the UI definition file of the UI corresponding to each application is stored in the UI definition file memory area 52 in advance in each of the above embodiments, it is also possible to obtain a necessary UI definition file externally as necessary. That is, if the necessary UI definition file is not stored in the memory unit 50 when the UI is generated, it is possible to obtain the necessary UI definition file by downloading it via the communication unit of the mobile phone 1.

In this case, if the UI definition file is specified from the application providing the UI at step S11 shown in FIG. 6, it is determined whether the necessary UI definition file is stored in the UI definition file memory area 52. If the necessary UI definition file is not stored in the UI definition file memory area 52, the UI obtaining unit 12 of the control unit 10 obtains the necessary UI definition file from external equipment or an external server (not shown) via the wireless communication unit 30. It is to be understood that not only the UI definition file but also each application may be obtained by downloading it from an external equipment or external server (not shown).

In each of the above embodiments, the mobile terminal having the touch panel executes the UI compound processing. However, the touch panel is not an essential element for the UI compound processing according to the present invention. The present invention may be applicable to any terminal having an input unit, with which a user may compound UIs to use, such as a terminal having an input unit with numerous mechanical keys or an input unit having a directional indicating device for selecting and determining an UI object by moving a pointer and the like, for example.

Shown below is an exemplary file in the UIML form based on XML as an example of the UI definition file used in each of the above embodiments. In this example, the UI object is defined by <template> tag, and thus a description between <template> and </template> corresponds to the UI object definition information. Here, it shows an example of the UI object definition information of the UI objects "Power" and "Channel Selection+" from the UI definition file (TV1_interface.uiml) composing the TV remocon UI. Among underlined parts, priority attribute indicates priority order information (priority is higher as the value is closer to 0).

```
<template id = "t1_switch1" priority ="0">
    <part>
            <part class="G:Button" id="switch1"/>
        <style>
            <property name="image-src">TV_resorce_switch1.jpg</property>
            <property name="g:text">Power</property>
                <property name="g:size">30,30</property>
        </style>
        <behavior>
            <rule>
                    <condition>
                    <op name="and">
                        <event class="KeyListener.g:keypressed"/>
                        <op name="equal">
                            <property event-class="KeyListener.g:keypressed" name="keyCode" />
                            <constant value="57398" />
                        </op>
                    </op>
                </condition>
                <action>
                        <call name="TVApp.on"/>
                </action>
                    </rule>
        </behavior>
            </part>
</template>
<template id = "t1_select_up" priority ="1"relate_id="select_1">
    <part>
            <part class="G:Button" id="select_up"/>
        <style>
            <property name="image-src">TV_resorce_select_up.jpg</property>
            <property name="g:text">Channel Selection +</property>
            <property name="g:size">30,20</property>
        </style>
        <behavior>
            <rule>
                    <condition>
                    <op name="and">
                        <event class="KeyListener.g:keypressed"/>
                        <op name="equal">
                            <property event-class="KeyListener.g:keypressed" name="keyCode" />
                            <constant value="57399" />
                        </op>
                    </op>
                </condition>
                <action>
                        <call name="TVApp.select_up"/>
                </action>
                    </rule>
        </behavior>
            </part>
</template>
```

INDUSTRIAL APPLICABILITY

According to the present invention, when generating a plurality of UIs (compound UI), it is possible to display a UI object for switching to a display of the stand-alone UI object group or to associate an action to switch to the display of the stand-alone UI object group with any of existing UI objects. Accordingly, it is possible to switch to the stand-alone UI as the source of the compound UI by a very simple operation even after UIs of a plurality of applications are compounded.

REFERENCE SIGNS LIST 1 mobile phone
10 control unit
11 application execution unit
12 user interface obtaining unit
13 user interface generation unit
14 timer unit
15 user interface event processing unit
20 touch panel
22 input unit
24 display unit
30 wireless communication unit
40 infrared communication unit
50 memory unit
51 application program memory area
52 user interface definition file memory area
53 individual user interface resource memory area
54 common user interface resource memory area
55 relevant application program information memory area
56 compound user interface definition file memory area
60 user interface compound processing unit
61 user interface object definition information analysis unit
62 user interface object selection processing unit
63 compound user interface definition file generation unit
64 automatic layout processing unit
65 user interface resource shaping unit
66 stand-alone UI activating user interface object generation unit

The invention claimed is:

1. A user interface generation apparatus comprising,
a memory unit capable of storing an application program; and
a control unit operable such that,
when instructed to generate a single user interface based on an application program stored in the memory unit, the control unit causes the display of a stand-alone user interface corresponding to the single user interface instructed and,
when instructed to generate a plurality of user interfaces, the control unit causes the display of a compound user interface in which user interface objects selected from a plurality of stand-alone user interfaces corresponding to the plurality of user interfaces instructed are compounded as one user interface that enables simultaneous control of a plurality of devices, wherein the selected user interface objects of the compound user interface only enable a user to control the operation of a particular device or devices,
wherein with respect to a first one of the stand-alone interfaces, the compound user interface includes only a subset of the total number of user interface objects of the first one of the stand-alone interfaces, and the control unit causes the display, in the compound user interface, of a stand-alone user interface activating object for switching to display of one of the plurality of stand-alone user interfaces, wherein the stand-alone user interface activating object is not one of the selected user interface objects, and
wherein the display automatically switches between display of a compound user interface and a stand-alone user interface if user input is not detected after a predetermined period of time.

* * * * *

UNITED STATES PATENT AND TRADEMARK OFFICE
CERTIFICATE OF CORRECTION

PATENT NO.         : 9,292,307 B2                           Page 1 of 1
APPLICATION NO.    : 13/056232
DATED              : March 22, 2016
INVENTOR(S)        : Yamamoto et al.

It is certified that error appears in the above-identified patent and that said Letters Patent is hereby corrected as shown below:

Title Page

Item (22), change "Jun. 29, 2009" to --Jul. 29, 2009--

Signed and Sealed this
Fourteenth Day of June, 2016

Michelle K. Lee
*Director of the United States Patent and Trademark Office*